United States Patent
Wang et al.

(10) Patent No.: US 12,015,459 B2
(45) Date of Patent: Jun. 18, 2024

(54) POSITION CONTROL OF ADAPTIVE PHASE-CHANGING DEVICES

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 10 days.

(21) Appl. No.: 17/997,587

(22) PCT Filed: May 17, 2021

(86) PCT No.: PCT/US2021/032748
§ 371 (c)(1),
(2) Date: Oct. 31, 2022

(87) PCT Pub. No.: WO2021/236510
PCT Pub. Date: Nov. 25, 2021

(65) Prior Publication Data
US 2023/0208479 A1 Jun. 29, 2023

Related U.S. Application Data

(60) Provisional application No. 63/026,555, filed on May 18, 2020.

(51) Int. Cl.
*H04B 7/0456* (2017.01)
*H04B 7/026* (2017.01)
*H04B 7/06* (2006.01)

(52) U.S. Cl.
CPC .......... *H04B 7/0456* (2013.01); *H04B 7/026* (2013.01); *H04B 7/0617* (2013.01)

(58) Field of Classification Search
CPC ..... H04B 7/026; H04B 7/0456; H04B 7/0617
(Continued)

(56) References Cited

U.S. PATENT DOCUMENTS 10,433,184 B2   10/2019   Lee et al.
2019/0208427 A1   7/2019   Rofougaran et al.
(Continued)

FOREIGN PATENT DOCUMENTS

| CN | 110225538 | 9/2019 |
| WO | 1996037970 | 11/1996 |
| WO | 2021236510 | 11/2021 |

OTHER PUBLICATIONS

"Foreign Office Action", IN Application No. 202247059603, dated Feb. 24, 2023, 8 pages.

(Continued)

*Primary Examiner* — Leila Malek
(74) *Attorney, Agent, or Firm* — Colby Nipper PLLC

(57) ABSTRACT

Techniques and apparatuses are described for modifying a position of an adaptive phase-changing device, APD. In aspects, a base station receives, from a user equipment, UE, at least one link quality parameter that is indicative of a channel impairment. The base station then identifies, using the at least one link quality parameter, a surface configuration for a reconfigurable intelligent surface (RIS) of an adaptive phase-changing device (APD) and transmits a first indication of the surface configuration using an adaptive phase-changing device control channel, APD control channel. In aspects, the base station determines using the at least one link quality parameter, a position configuration for the APD and transmits a second indication of the position configuration to the APD. The base station then communicates with the UE using the APD.

20 Claims, 18 Drawing Sheets

(58) Field of Classification Search
USPC .......................................................... 375/262
See application file for complete search history.

(56) References Cited

U.S. PATENT DOCUMENTS

2020/0112917 A1    4/2020   Nam et al.
2023/0258759 A1*   8/2023   Wang .................... G01S 5/0273
                                                           455/456.1

OTHER PUBLICATIONS

"International Search Report and Written Opinion", Application No. PCT/US2021/032748, dated Aug. 17, 2021, 10 pages.

Jung, et al., "On the Optimality of Reconfigurable Intelligent Surfaces (RISs): Passive Beamforming, Modulation, and Resource Allocation", IEEE, arXiv:1910.00968v1 [cs.IT] Oct. 2, 2019, Oct. 2, 2019, 31 pages.

Liu, "Intelligent Reflecting Surface Meets Mobile Edge Computing: Enhancing Wireless Communications for Computation Offloading", Jan. 28, 2020, 12 pages.

Nadeem, et al., "Intelligent Reflecting Surface Assisted Wireless Communication: Modeling and Channel Estimation", Dec. 13, 2019, 7 pages.

Renzo, et al., "Reconfigurable Intelligent Surfaces vs. Relaying: Differences, Similarities, and Performance Comparison", IEEE arXiv:1908.08747v2 [eess.SP] Feb. 21, 2020, Feb. 21, 2020, 7 pages.

Renzo, et al., "Smart Radio Environments Empowered by AI Reconfigurable Meta-Surfaces: An Idea Whose Time Has Come", retrieved from https://arxiv.org/pdf/1903.08925.pdf on Mar. 13, 2020, 32 pages.

Wu, et al., "Intelligent Reflecting Surface Enhanced Wireless Network via Joint Active Passive Beamforming", Aug. 12, 2019, 35 pages.

Zhang, et al., "Augmenting Transmission Environments for Better Communications: Tunable Reflector Assisted MmWave WLANs", Apr. 2020, 13 pages.

Zhang, "Positioning with Dual Reconfigurable Intelligent Surfaces in Millimeter-Wave MIMO Systems", Abstract Only, Aug. 2020, 3 pages.

"Foreign Office Action", AU Application No. 2021277195, dated May 25, 2023, 4 pages.

Wu, et al., "Intelligent Reflecting Surface Enhanced Wireless Network: Joint Active and Passive Beamforming Design", Dec. 9, 2018, 6 pages.

"International Preliminary Report on Patentability", Application No. PCT/US2021/032748, dated Nov. 17, 2022, 8 pages.

"Foreign Office Action", EP Application No. 21730767.7, Feb. 15, 2024, 10 pages.

"Partial European Search Report", EP Application No. 21730767.7, Dec. 14, 2023, 7 pages.

Cai, et al., "Practical Modeling and Beamforming for Intelligent Reflecting Surface Aided Wideband Systems", Jul. 2020, 4 pages.

Nadeem, et al., "Asymptotic Max-Min SINR Analysis of Reconfigurable Intelligent Surface Assisted MISO Systems" Dec. 2020, 17 pages.

* cited by examiner

POSITION CONTROL OF ADAPTIVE PHASE-CHANGING DEVICES

RELATED APPLICATION(S)

This application is a national stage entry of International Application No. PCT/US2021/032748, filed May 17, 2021, which claims the benefit of U.S. Provisional Application No. 63/026,555, filed May 18, 2020, the disclosures of which are incorporated herein by reference in their entirety.

BACKGROUND

Evolving wireless communication systems, such as fifth generation (5G) technologies and sixth generation (6G) technologies, use various techniques that increase data capacity relative to preceding wireless networks. As one example, 5G technologies transmit data using higher frequency ranges, such as the above-6 Gigahertz (GHz) band. As another example, the 5G technologies support multiple-input, multiple-output (MIMO) communications that use multiple transmission and/or reception paths. While these techniques can increase data capacity, transmitting and recovering information using these techniques also poses challenges. To illustrate, higher frequency signals and MIMO transmissions are more susceptible to multi-path fading and other types of path loss, which leads to recovery errors at a receiver. It therefore becomes desirable to compensate the signal distortions in order to obtain the performance benefits (e.g., increased data capacity) provided by these approaches.

SUMMARY

This document describes techniques and apparatuses for position control of adaptive phase-changing devices. In aspects, a base station receives, from a user equipment (UE), at least one link quality parameter that is indicative of a channel impairment. The base station then identifies, using the at least one link quality parameter, a surface configuration for a reconfigurable intelligent surface (RIS) of an adaptive phase-changing device (APD) and transmits a first indication of the surface configuration using an adaptive phase-changing device control channel (APD control channel). In aspects, the base station determines, using the at least one link quality parameter, a position configuration for the APD and transmits a second indication of the position configuration to the APD. The base station then communicates with the UE using the APD.

In one or more aspects, an adaptive phase-changing device (APD) modifies a position of the APD (e.g., a physical position, location, and/or orientation of the APD). The APD receives, from a base station and over an adaptive phase-changing device control channel (APD control channel), a first indication of a surface configuration for a Reconfigurable Intelligent Surface (RIS) of the APD and modifies the RIS of the APD using the surface configuration. The APD also receives, from the base station and over the APD control channel, a second indication of a position configuration and modifies the position of the APD using the position configuration.

The details of one or more implementations of position control of adaptive phase-changing devices are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of position control of adaptive phase-changing devices are described below. The use of the same reference numbers in different instances in the description and the figures indicate similar elements.

DETAILED DESCRIPTION

Figure 1:
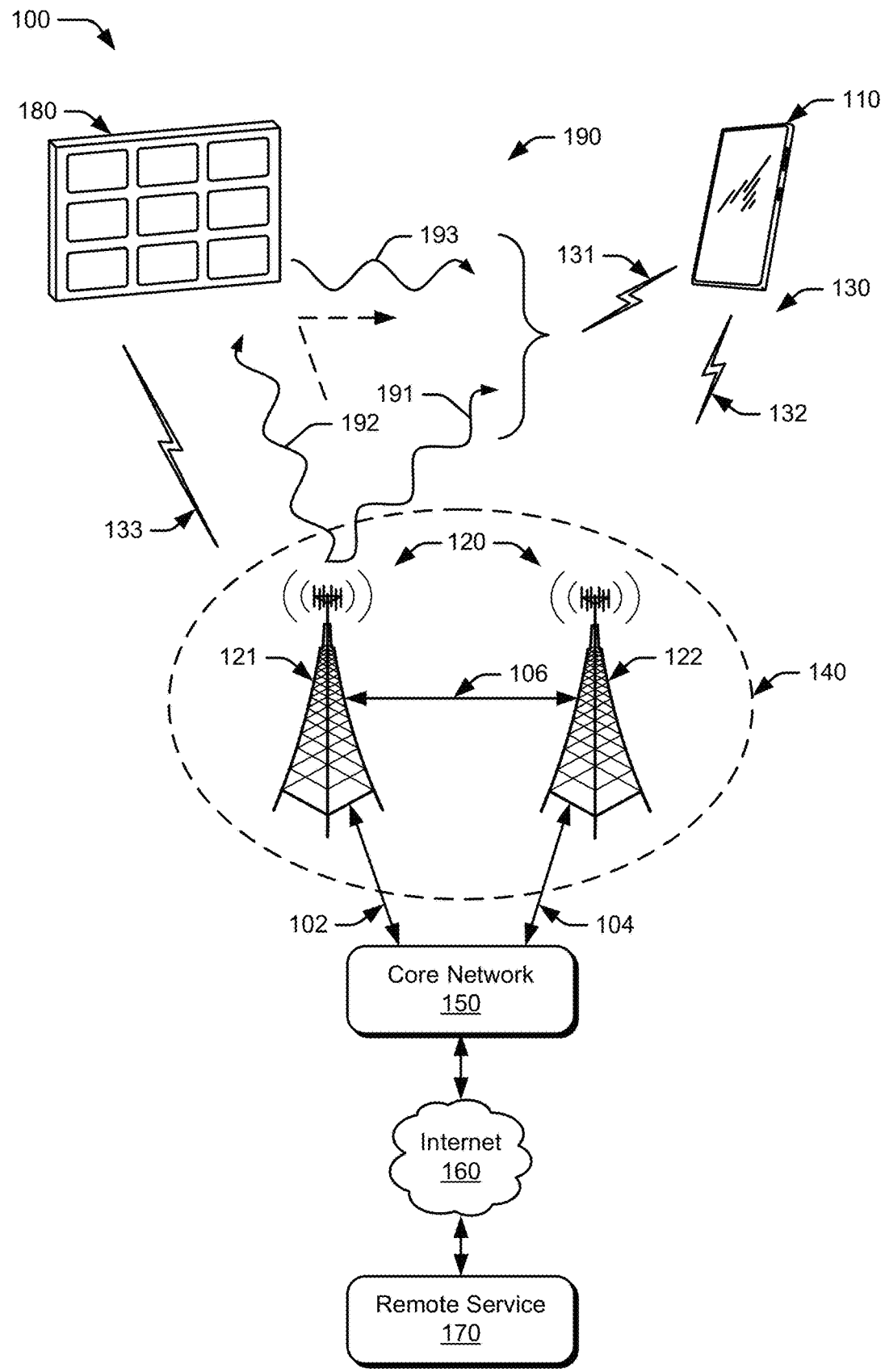
FIG. 1 illustrates an example operating environment in which various aspects of position control of adaptive phase-changing devices can be implemented.

Evolving wireless communication systems use various techniques to meet usage demands that strain or exceed the capabilities of preceding wireless communication systems. To illustrate, next-generation user devices implement applications that consume larger quantities of user data relative to preceding applications. To deliver these larger quantities of user data, evolving wireless communication systems (e.g., 5G, 6G) transmit at higher frequencies (e.g., millimeter-wave range), sometimes with MIMO, to increase data capacity. While higher frequencies and MIMO communications provide higher data throughput, channel conditions can negatively impact the efficacy of these techniques. As an example, mmWave signals have high throughput under Line of Sight (LoS) conditions, but reflections create multi-path and frequency-selective fading that may increase recovery errors at the receiver.

Adaptive phase-changing devices (APDs) include a Reconfigurable Intelligent Surface (RIS) that, when properly configured, modifies propagating signals to correct for or reduce errors introduced by communication path(s), such as small scale fading and fading MIMO channels. Generally, an RIS includes configurable surface materials that shape how incident signals striking with the surface of the materials are transformed. To illustrate, the configuration of the surface materials can affect the phase, amplitude, and/or polarization of the transformed signal. Thus, modifying a surface configuration of the RIS changes how signals are transformed. However, channel conditions oftentimes change dynamically, such as when a receiving device (e.g., a user equipment) moves or when various objects move into or out of a transmission path. Thus, a surface configuration applied to the RIS at a first point in time may not be suitable at a second point in time due to the dynamic changes in the channel conditions.

A base station and user equipment (UE) frequently provide one another with feedback on received signals through various link quality parameters, such as a received signal strength indicator (RSSI), power information, signal-to-interference-plus-noise ratio (SINR) information, reference signal receive power (RSRP), channel quality indicator (CQI) information, channel state information (CSI), Doppler feedback, BLock Error Rate (BLER), Quality of Service (QoS), Hybrid Automatic Repeat reQuest (HARQ) information (e.g., first transmission error rate, second transmission error rate, maximum retransmissions), uplink SINR, timing measurements, error metrics, etc. For example, a base station generates uplink quality parameters based on uplink wireless signals received from a UE and/or receives downlink quality parameters generated by the UE. In aspects, the UE receives the uplink quality parameters from the base station. These link quality parameters allow a base station (and UE) to monitor how well the UE receives (downlink) signals and/or how well the base station receives (uplink) signals.

In implementations that utilize an APD in a communication path, the base station analyzes the link quality parameters to configure and/or reconfigure an RIS of the APD. Alternatively, or additionally, the UE analyzes the link quality parameters and determines when to request utilizing an APD in the communication path and/or reconfiguration of the RIS of the APD. Thus, as channel conditions change, the base station identifies when to reconfigure the RIS, determines a surface configuration based on current channel conditions (e.g., indicated by the link quality parameters), and reconfigures the RIS to mitigate channel impairments (e.g., multi-path fading) and improve data rates, data throughput, and reliability. In some aspects, the base station determines a position configuration to physically adjust the APD, such as rotational adjustments and/or linear translation adjustments.

In aspects, a base station receives, from a user equipment (UE), at least one link quality parameter that is indicative of a channel impairment. The base station then identifies, using the at least one link quality parameter, a surface configuration for a reconfigurable intelligent surface (RIS) of an adaptive phase-changing device (APD) and transmits a first indication of the surface configuration using an adaptive phase-changing device control channel (APD control channel). In aspects, the base station determines, using the at least one link quality parameter, a position configuration for the APD and transmits a second indication of the position configuration to the APD. The base station then communicates with the UE using the APD.

In one or more aspects, an adaptive phase-changing device (APD) modifies a position of the APD. The APD receives, from a base station and over an adaptive phase-changing device control channel (APD control channel), a first indication of a surface configuration for a Reconfigurable Intelligent Surface (RIS) of the APD and modifies the RIS of the APD using the surface configuration. The APD also receives, from the base station and over the APD control channel, a second indication of a position configuration and modifies the position of the APD using the position configuration.

Example Environments

FIG. 1 illustrates an example environment 100, which includes a user equipment 110 (UE 110) that can communicate with base stations 120 (illustrated as base stations 121 and 122) through one or more wireless communication links 130 (wireless link 130), illustrated as wireless links 131 and 132. Alternatively, or additionally, the wireless links 130 include a wireless link 133 between at least one of the base stations 120 (e.g., base station 121) and an adaptive phase-changing device 180 (APD 180) to control a surface configuration of the APD 180, but in alternative or additional implementations, the base stations 120 include a wireline interface for control communications with the APD 180. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, distributed base stations, and the like, or any combination thereof.

One or more base stations 120 communicate with the user equipment 110 using the wireless links 131 and 132, which may be implemented as any suitable type of wireless link.

The wireless links 131 and 132 include control-plane information and/or user-plane data, such as downlink user-plane data and control-plane information communicated from the base stations 120 to the user equipment 110, uplink of other user-plane data and control-plane information communicated from the user equipment 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation or multi-connectivity technology to provide a higher data rate for the UE 110. Multiple wireless links 130 from multiple base stations 120 may be configured for Coordinated Multipoint (CoMP) communication with the UE 110.

In some implementations, the wireless links (e.g., wireless link 131 and/or wireless link 132) utilize wireless signals, where an intermediate device (e.g., APD 180) transforms one or more ray(s) 190 of the wireless signals, where the ray(s) 190 are illustrated as signal ray 191, signal ray 192, and signal ray 193. To illustrate, in the environment 100, the signal ray 191, the signal ray 192, and the transformed signal ray 193 correspond to rays of a downlink wireless signal used to implement the wireless link 131, but can alternatively or additionally correspond to an uplink wireless signal from the UE 110. As part of communicating with the UE 110 through wireless link 131, the base station 121 beams a downlink wireless signal intended for the UE 110. A first ray of the downlink wireless signal (e.g., signal ray 191) propagates towards the UE 110 in a line-of-sight manner, and a second ray of the downlink wireless signal (e.g., signal ray 192) propagates towards the APD 180. The signal ray 192 strikes the surface of the APD 180 and transforms into signal ray 193 that propagates towards the UE 110. In aspects, the signal ray 192 strikes the surface of an RIS of the APD 180. Note that the line-of-sight signal ray 191 may be dynamically blocked or attenuated by foliage, human bodies, or other materials (not shown).

The base station 121 configures an RIS of the APD 180 to direct how the RIS alters signal properties (e.g., phase, amplitude, polarization) of a wireless signal. For example, the base station 121 communicates RIS surface-configuration information to the APD 180 using the wireless link 133 (e.g., an adaptive phase-changing device slow-control channel (APD slow-control channel), an adaptive phase-changing device fast-control channel (APD fast-control channel)). In various implementations, the base station 121 determines a surface configuration for the APD 180 based on downlink quality parameters from the UE 110, uplink quality parameters generated by the base station 121, and/or link quality parameters obtained from historical records as further described.

The base stations 120 are collectively a Radio Access Network 140 (e.g., RAN, Evolved Universal Terrestrial Radio Access Network, E-UTRAN, 5G NR RAN or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an S1 interface for control-plane signaling and user-plane data communications when connecting to an Evolved Packet Core (EPC) network. The base stations 121 and 122 can communicate using an Xn Application Protocol (XnAP) through an Xn interface or using an X2 Application Protocol (X2AP) through an X2 interface, at 106, to exchange user-plane and control-plane data. The user equipment 110 may connect, via the core network 150, to public networks, such as the Internet 160, to interact with a remote service 170.

Example Devices

Figure 2:
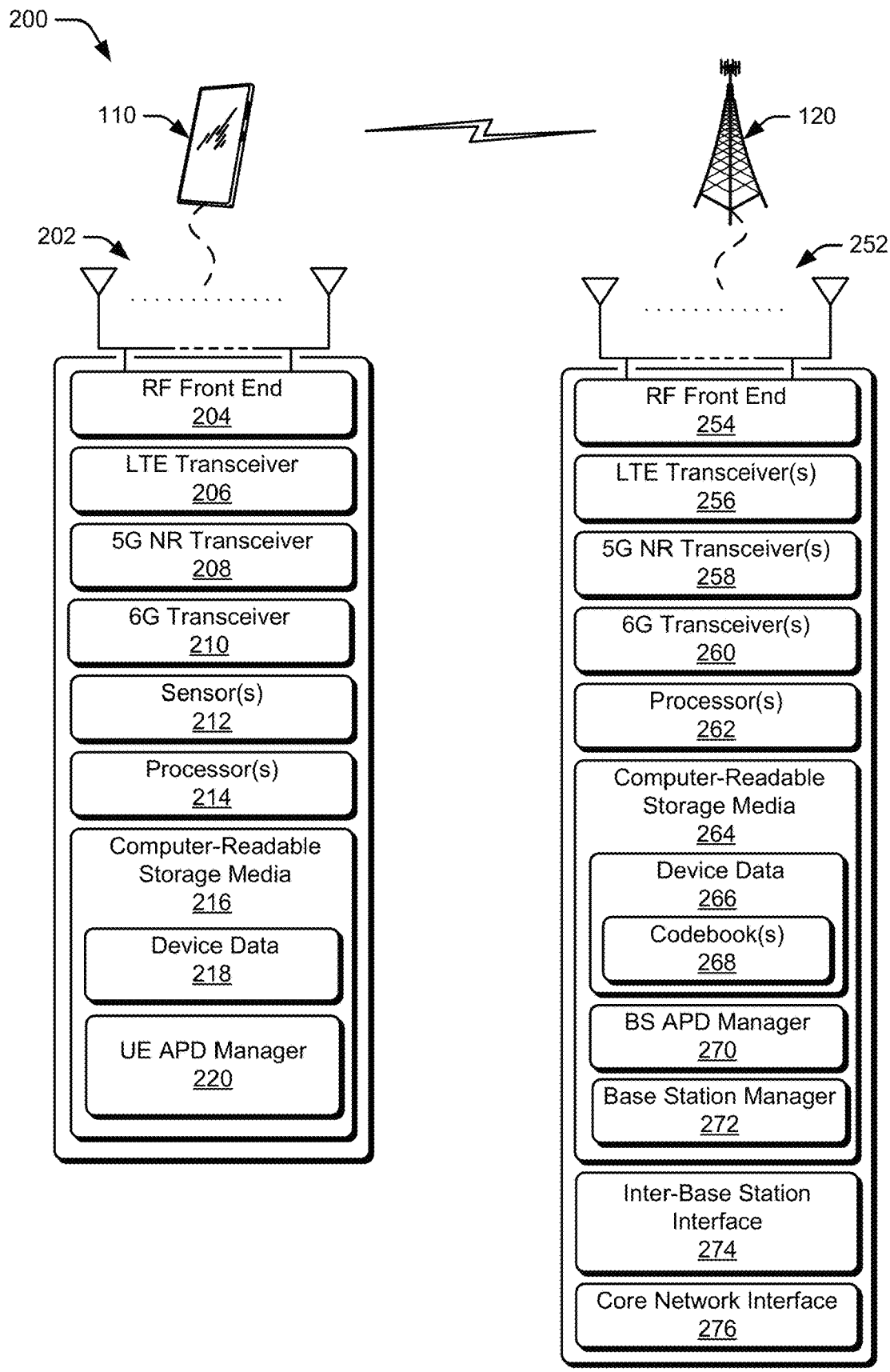
FIG. 2 illustrates an example device diagram of network entities that can implement various aspects of position control of adaptive phase-changing devices.

FIG. 2 illustrates an example device diagram 200 of the user equipment 110 and base stations 120. Generally, the device diagram 200 describes network entities that can implement various aspects of position control of adaptive phase-changing devices. FIG. 2 shows respective instances of the UE 110 and the base stations 120. The UE 110 or the base stations 120 may include additional functions and interfaces that are omitted from FIG. 2 for the sake of visual brevity. The UE 110 includes antennas 202, a radio frequency front end 204 (RF front end 204), and radio-frequency transceivers that include any one or more of an LTE transceiver 206, a 5G NR transceiver 208, and/or a 6G transceiver 210 for communicating with base stations 120 in the RAN 140. The RF front end 204 of the UE 110 can couple or connect the LTE transceiver 206, the 5G NR transceiver 208, and the 6G transceiver 210 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206 and/or the 5G NR transceiver 208. Additionally, the antennas 202, the RF front end 204, the LTE transceiver 206, the 5G NR transceiver 208, and/or the 6G transceiver 210 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards (e.g., 57-64 GHz, 28 GHz, 38 GHz, 71 GHz, 81 GHz, or 92 GHz bands).

The UE 110 includes sensors 212 that can be implemented to detect various properties such as temperature, orientation, acceleration, proximity, distance, supplied power, power usage, battery state, or the like. As such, the sensors of the UE 110 may include any one or a combination of accelerometers, gyros, depth sensors, distance sensors, temperature sensors, thermistors, battery sensors, and power usage sensors.

The UE 110 also includes processor(s) 214 and computer-readable storage media 216 (CRM 216). The processor 214 may be a single-core processor or a multiple-core processor implemented with a homogenous or heterogeneous core structure. The computer-readable storage media described herein excludes propagating signals. CRM 216 may include any suitable memory or storage device such as random-access memory (RAM), static RAM (SRAM), dynamic RAM (DRAM), non-volatile RAM (NVRAM), read-only memory (ROM), or Flash memory useable to store device data 218 of the UE 110. The device data 218 includes any combination of user data, multimedia data, codebook(s), applications, and/or an operating system of the UE 110. In implementations, the device data 218 stores processor-executable instructions that are executable by processor(s) 214 to enable user-plane communication, control-plane signaling, and user interaction with the UE 110.

The CRM 216 of the UE 110 may optionally include a user equipment adaptive phase-changing device manager 220 (UE APD manager 220). Alternatively, or additionally, the UE APD manager 220 may be implemented in whole or part as hardware logic or circuitry integrated with or separate from other components of the UE 110. In aspects, the UE APD manager 220 of the UE 110 analyzes link quality parameters and determines to request utilizing an APD in a communication path with a base station. Alternatively, or additionally, the UE APD manager 220 determines to request a reconfiguration of a (RIS) surface of a current APD utilized in the communication path. The UE APD manager 220 then sends, to the base stations 120, an indication to utilize and/or reconfigure an APD in the communication path.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, one or more 5G NR transceivers 258, and/or one or more 6G transceivers 260 for communicating with the UE 110. The RF front end 254 of the base stations 120 can couple or connect the LTE transceivers 256, the 5G NR transceivers 258, and the 6G transceivers 260 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency bands defined by the 3GPP LTE and 5G NR communication standards and implemented by the LTE transceivers 256, the 5G NR transceivers 258, and/or the 6G transceivers 260. Additionally, the antennas 252, the RF front end 254, the LTE transceivers 256, the 5G NR transceivers 258, and/or the 6G transceivers 260 may be configured to support beamforming, such as Massive-MIMO, for the transmission and reception of communications with the UE 110.

The base stations 120 also include processor(s) 262 and computer-readable storage media 264 (CRM 264). The processor 262 may be a single-core processor or a multiple-core processor composed of a variety of materials, such as silicon, polysilicon, high-K dielectric, copper, and so on. CRM 264 may include any suitable memory or storage device such as random-access memory (RAM), static RAM (SRAM), dynamic RAM (DRAM), non-volatile RAM (NVRAM), read-only memory (ROM), or Flash memory useable to store device data 266 of the base stations 120. The device data 266 includes network scheduling data, radio resource management data, applications, and/or an operating system of the base stations 120, which are executable by processor(s) 262 to enable communication with the UE 110. The device data 266 also includes codebook(s) 268, such as surface-configuration codebook(s) that store surface-configuration information for a RIS of an APD. In some aspects, the surface-configuration codebook(s) include phase vector information and/or beam configuration information. Alternatively, or additionally, the codebook(s) 268 include a phase-sweeping codebook that includes and/or indicates phase-sweeping patterns as further described.

In aspects, the CRM 264 of the base station 120 also includes a base station-adaptive phase-changing device manager 270 (BS APD manager 270) for managing APD usage in communication path(s) with the UE 110. Alternatively, or additionally, the BS APD manager 270 may be implemented in whole or part as hardware logic or circuitry integrated with or separate from other components of the base station 120. To manage the usage of APD(s) in communication paths, the BS APD manager 270 identifies APDs near the UE 110 and determines when to utilize the APD(s) in the communication path. The BS APD manager 270 also determines surface configurations for the APD (e.g., RIS configurations), such as initial surface configurations and/or surface reconfigurations based on link quality parameters as further described. In some implementations, the BS APD manager 270 receives an indication from the UE 110 to request utilization of an APD in the communication path and/or to perform a surface reconfiguration of the existing APD utilized in the communication path. In some implementations, the BS APD manager 270 also determines position configurations for the APD, such as a rotation or a linear adjustment of the APD, based on link quality parameters as further described.

CRM 264 also includes a base station manager 272. Alternatively, or additionally, the base station manager 272 may be implemented in whole or part as hardware logic or circuitry integrated with or separate from other components of the base stations 120. In at least some aspects, the base station manager 272 configures the LTE transceivers 256, 5G NR transceivers 258, and 6G transceiver 260 for communication with the UE 110, the APD 180, and/or communication with a core network. The base stations 120 include an inter-base station interface 274, such as an Xn and/or X2 interface, which the base station manager 272 configures to exchange user-plane and control-plane data between another base station 120, to manage the communication of the base stations 120 with the UE 110. The base stations 120 include a core network interface 276 that the base station manager 272 configures to exchange user-plane data and control-plane information with core network functions and/or entities.

Figure 3:
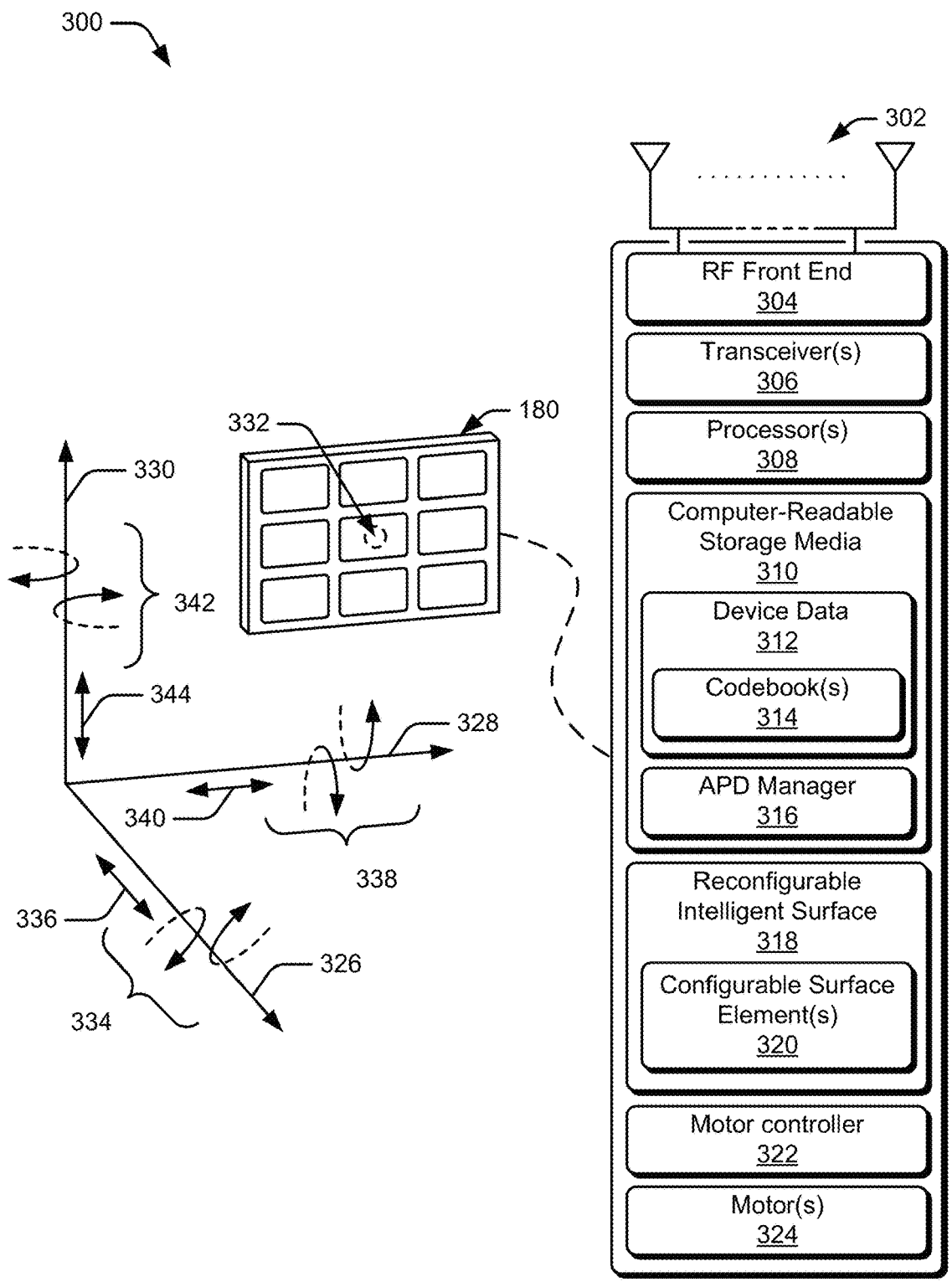
FIG. 3 illustrates an example device diagram of an adaptive phase-changing device that can implement various aspects of position control of adaptive phase-changing devices.

FIG. 3 illustrates an example device diagram 300 of the APD 180. Generally, the device diagram 300 describes an example entity that can implement various aspects of position control of adaptive phase-changing devices, but may include additional functions and interfaces that are omitted from FIG. 3 for the sake of visual brevity. The adaptive phase-changing device (APD) 180 is an apparatus that includes a Reconfigurable Intelligent Surface (RIS) 318, and components for controlling the RIS 318 (e.g., by modifying the surface configuration of the RIS), as further described below. In some implementations, the APD 180 may also include components for modifying the position of the APD 180 itself (e.g., modifying a physical position, location, and/or orientation of the APD using movement commands to a motor controller), which in turn modifies the position of the RIS 318.

The APD 180 includes one or more antenna(s) 302, a radio frequency front end 304 (RF front end 304), and one or more radio-frequency transceivers 306 for wirelessly communicating with the base stations 120 and/or the UE 110. The antenna(s) 302 of the APD 180 may include an array of multiple antennas that are configured similar to or differently from each other. Additionally, the antennas 302, the RF front end 304, and the transceiver(s) 306 may be configured to support beamforming for the transmission and reception of communications with the base stations 120. By way of example and not limitation, the antennas 302 and the RF front end 304 can be implemented for operation in sub-gigahertz bands, sub-6 GHz bands, and/or above-6 GHz bands. Thus, the antenna 302, the RF front end 304, and the transceiver(s) 306 provide the APD 180 with an ability to receive and/or transmit communications with the base station 120, such as information transmitted using APD control channels (e.g., an APD slow-control channel, an APD fast-control channel) as further described.

The APD 180 includes processor(s) 308 and computer-readable storage media 310 (CRM 310). The processor 308 may be a single-core processor or a multiple-core processor implemented with a homogenous or heterogeneous core structure. The computer-readable storage media described herein excludes propagating signals. CRM 310 may include any suitable memory or storage device such as random-access memory (RAM), static RAM (SRAM), dynamic RAM (DRAM), non-volatile RAM (NVRAM), read-only memory (ROM), or Flash memory useable to store device data 312 of the APD 180. The device data 312 includes user data, multimedia data, codebooks, applications, and/or an operating system of the APD 180, which are executable by processor(s) 308 to enable dynamic configuration of the APD 180 as further described. For example, the device data 312 includes one or more surface-configuration codebooks 314 (codebooks 314) with surface-configuration information, such as phase vector configuration information and/or a beam configuration information, that can be used to configure elements of an RIS. Alternatively, or additionally, the device data 312 includes a phase-sweeping codebook that includes and/or indicates phase-sweeping patterns as further described.

In aspects of position control of adaptive phase-changing devices, the CRM 310 of the APD 180 includes an adaptive phase-changing device manager 316 (APD manager 316). Alternatively, or additionally, the APD manager 316 may be implemented in whole or part as hardware logic or circuitry integrated with or separate from other components of the APD 180. Generally, the APD manager 316 manages a surface configuration of the APD 180, such as by processing information exchanged with a base station over wireless link(s) 133 and using the information to configure a reconfigurable intelligent surface 318 (RIS 318) of the APD 180. To illustrate, the APD manager 316 receives an indication of a surface configuration over the wireless links 133 (e.g., an APD slow-control channel, an APD fast-control channel), extracts the surface configuration from the codebook(s) 314 using the indication, and applies the surface configuration to the RIS 318. Alternatively or additionally, the APD manager 316 manages a position of the APD, such as by receiving directions to change the position of the APD 180 from the base station 120, and initiating changes to a physical position, location, and/or orientation of the APD 180 (and/or a platform to which the APD 180 is attached) as further described. In aspects, the APD manager 316 initiates the transmission of uplink messages to the base station over the wireless links 133, such as acknowledgments/negative acknowledgments (ACKs/NACKs). The APD manager 316 may also receive an indication of a phase-sweeping pattern over the wireless links 133 and apply various surface configurations to the RIS based on the phase-sweeping pattern.

The RIS 318 of the APD 180 includes one or more configurable surface element(s) 320, such as configurable electromagnetic elements, configurable resonator elements, or configurable reflectarray antenna elements. Generally, the configurable surface elements 320 can be (programmatically) configured to control how the RIS 318 transforms incident waveforms. By way of example and not of limitation, configurable electromagnetic elements include scattering particles that are connected electronically (e.g., through PIN diodes). Implementations use the electronic connection to arrange the scattering particles, such as based on principles of reflection, to control a phase, amplitude, and/or polarization of the transformed waveform (from the incident waveform). The RIS 318 can include array(s) of configurable surface element(s) 320, where an array can include any number of elements having any size.

The APD 180 includes a motor controller 322 communicating with one or more motor(s) 324. The motor controller 322 may send commands to the motors 324 that alter one or more kinematic behaviors of the motors 324 (e.g., a shaft rotation of a stepper motor in degrees, a shaft rotation rate of a stepper motor in revolutions per minute (RPM), a linear movement of a linear motor in millimeters (mm), a linear velocity of a linear motor in meters/second (m/s)). The one or more motors 324 may, in turn, may be linked to mechanisms that mechanically position a platform (e.g., avionics of a drone, a drive of a linear rail system, a gimble within a base station, a linear bearing within a base station) to which the APD 180 is attached. Through the commands, which the motor controller 322 sends to the motors 324, a physical position, location, and/or orientation of the APD 180 (and/or the platform to which the APD 180 is attached) may be altered. In response to receiving a position configuration from a base station, the APD manager 316 communicates movement commands to the motor controller 322, such as through a software interface and/or hardware addresses, based on the position configuration.

The APD 180 can include multiple motors, where each motor corresponds to a different rotational or linear direction of movement. Examples of motor(s) 324 that can be used to control orientation and location of the APD include linear servo motors that might be part of a (i) rail system to which the APD is mounted, (ii) motors controlling a direction and pitch, yaw, roll of a drone to which the APD is mounted, (iii) radial servo or stepper motors that rotate an axis if the APD is in a fixed position or on a gimbal, and so on.

For clarity, the motor controller 322 and the motors 324 are illustrated as being a part of the APD 180, but in alternative or additional implementations, the APD 180 communicates with motor controllers and/or motors external to the APD. To illustrate, the APD manager 316 communicates a position configuration to a motor controller that mechanically positions a platform attached to the APD 180. In aspects, the APD manager 316 communicates the position configuration to the motor controller using a local wireless link, such as Bluetooth™, Zigbee, IEEE 802.15.4, or a hardwire link. The motor controller then adjusts the platform based on the position configuration using one or more motors. The platform can correspond to, or be attached to, any suitable mechanism that supports rotational and/or linear adjustments, such as a drone, a rail propulsion system, a hydraulic lift system, and so forth.

X-axis 326, Y-axis 328, and Z-axis 330 define a spatial area and provide a framework for indicating a position configuration through rotational and/or linear adjustments. In the environment 300, the X-axis 326, the Y-axis 328, and the Z-axis 330 are orthogonal to one another. While these axes are generally labeled as the X-axis, Y-axis, and Z-axis, other frameworks can be utilized to indicate the position configuration. To illustrate, aeronautical frameworks reference the axes as vertical (yaw), lateral (pitch), and longitudinal (roll) axes, while other movement frameworks reference the axes as vertical, sagittal, and frontal axes.

As one example, position 332 generally points to a center position of the APD 180 that corresponds to a baseline position (e.g., position (0,0,0) using XYZ coordinates). In aspects, the APD manager 316 communicates a rotational adjustment (e.g., rotational adjustments 334) around the X-axis 326 to the motor controller 322, where the rotational adjustment includes a rotational direction (e.g., clockwise or counterclockwise), an amount of rotation (e.g., degrees), and/or a rotation velocity. Alternatively, or additionally, the APD manager 316 communicates a linear adjustment 336 along the X-axis, where the linear adjustment includes any combination of a direction, a velocity, and/or a distance of the adjustment. At times, the APD manager 316 communicates adjustments around the other axes as well, such as any combination of rotational adjustments 338 around the Y-axis 328, linear adjustments 340 along the Y-axis 328, rotational adjustments 342 around the Z-axis 330, and/or linear adjustments 344 along the Z-axis 330. Thus, the position configuration can include combinations of rotational and/or linear adjustments in all three degrees of spatial freedom. This allows the APD manager 316 to communicate physical adjustments to the APD 180. Alternatively, or additionally, the APD manager communicates RIS surface configurations as further described.

Controlling Adaptive Phase-Changing Devices

Figure 4:
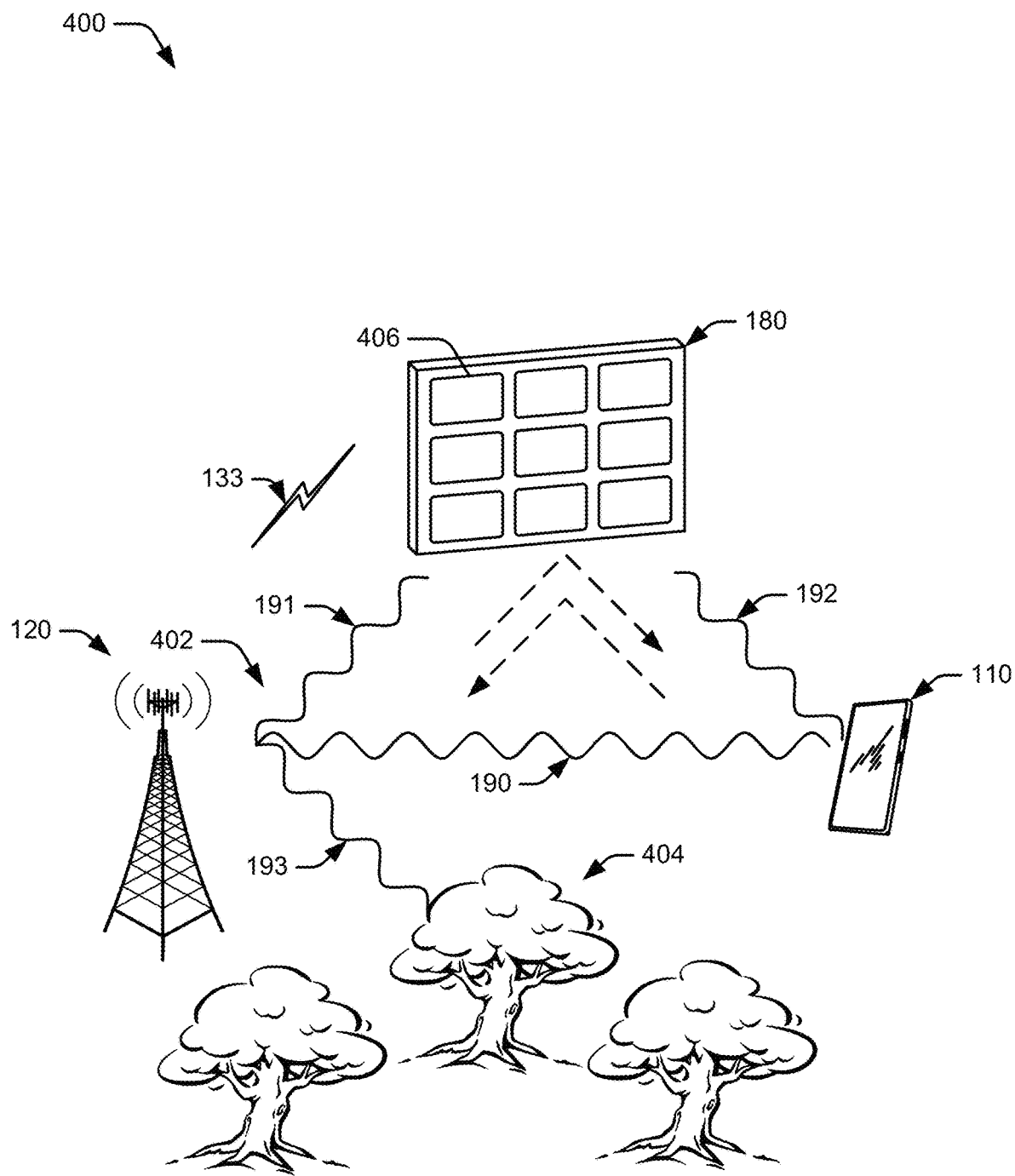
FIG. 4 illustrates an example environment in accordance with various implementations of position control of adaptive phase-changing devices.

FIG. 4 illustrates an example environment 400 in which position control of adaptive phase-changing devices is implemented in accordance with various aspects. The environment 400 includes the base station 120, the UE 110, and the APD 180 of FIG. 1. The base station 120 communicates with the UE 110 over the wireless link 131 (see FIG. 1) by transmitting a downlink wireless signal 402 that covers a spatial region. To illustrate, the wireless signal 402 includes the signal ray 190 that propagates towards the UE 110 in a line-of-sight manner, the signal ray 191 that propagates towards the APD 180, and the signal ray 193 that propagates towards an object 404 (illustrated as foliage) that blocks the UE 110 from receiving the signal ray 193. Alternatively, or additionally, the UE 110 communicates with the base station 120 over the wireless link 131 by transmitting an uplink wireless signal.

In various implementations, the APD 180 participates in the uplink and/or downlink communications between the base station 120 and the UE 110 by transforming waveforms using an RIS with a surface configuration determined by the base station 120. To illustrate, the signal ray 191 strikes the surface of the APD 180, labeled as RIS 406, and transforms into the signal ray 192, which is directed towards the UE 110. As part of receiving the wireless signal 402, the UE 110 receives the signal ray 190 and the signal ray 192 (but not the signal ray 193).

In implementations, the base station 120 configures the RIS 406 to direct how the signal ray 191 transforms into the signal ray 192 for downlink communications. Alternatively, or additionally, for uplink communications, the base station 120 directs how the RIS 406 transforms signal ray 192 into signal ray 191. For example, the base station 120 analyzes link quality parameters (e.g., downlink quality parameters, uplink quality parameters, historical link quality parameters) to identify channel impairments. By way of example, and not of limitation, various link quality parameters that do not meet an acceptable performance level can indicate channel impairments, such as by a delay spread between a first received signal and a last received signal (e.g., received multi-path rays) exceeding an acceptable delay spread threshold, or by an average time-delay (of the multi-path rays) exceeding an acceptable average time-delay threshold and/or absorption by an object that blocks a ray. As another example, the link quality parameters can be used to obtain an estimated UE-location, such as through power levels and/or timing information (e.g., time of arrival). Alternatively, or additionally, the base station uses multi-lateration and/or communicates with other base stations to obtain an estimated UE-location. In some aspects, the base station receives the estimated UE-location from the UE 110, such as by using a low-band channel (e.g., 700 MHz, 800 MHz). The base station 120 then uses the estimated UE-location to access historical records that indicate a history of channel impairment(s) at the estimated UE-location. In response to identifying the channel impairments, the base station 120 selects a surface configuration for the RIS 406 that transforms at least a portion of a first wireless signal (e.g., signal ray 191) into a second wireless signal (e.g., signal ray 192) to mitigate the channel impairments by improving a received signal quality.

To illustrate, the signal ray 190 and the signal ray 192 combine at a receiver of the UE 110, thus generating a combined received signal. The UE 110 then processes the combined received signal to extract control-plane information and/or user-plane data, rather than processing signal ray 190 only. In implementations, the base station 120 configures the RIS 406 such that the transformed signal (e.g., signal ray 192 for downlink communications) mitigates the channel impairments when combined with the signal ray 190. In other words, the addition of the signal ray 192 to the signal ray 190 at the receiver of the UE 110 improves the (combined) received signal by decreasing destructive interference and/or improving constructive interference caused by the multiple transmissions relative to combinations of signal rays without the signal ray 192. Thus, processing the combined received signal improves information recovery at the UE 110 by improving the received signal quality.

The environment 400 illustrates an example implementation in which the base station 120 transmits the wireless signal 402 in a direction towards the UE 110 such that the wireless signal 402 includes a direct signal ray (e.g., signal ray 190) that propagates directly towards the UE 110. In alternative or additional implementations, the base station 120 transmits a wireless signal with direct signal rays propagating towards the APD 180 and/or without direct signal rays propagating towards the UE 110. To illustrate, assume the base station 120 identifies an unexpected path loss by analyzing link parameters from the UE 110 that indicate how the UE 110 received the signal ray 190. In response to this determination, the base station 120 determines a new transmission direction for the wireless signal 402 such that a majority of signal rays in the wireless signal 402 propagate directly towards the APD 180 instead of the UE 110. As one example, the base station 120 selects a beam direction or a narrow beam directly towards the APD 180, rather than a beam direction or a wide beam directly towards the UE 110.

In aspects, the base station 120 selects the surface configuration from a surface-configuration codebook. As one example, the base station 120 analyzes the codebook to identify a surface configuration that modifies and/or transforms various signal characteristics of a wireless signal, such as modifying one or more desired phase characteristic(s), one or more amplitude characteristic(s), a polarization characteristic, and so forth. In some implementations, the base station 120 uses historical records to select a surface configuration. For instance, the base station obtains an estimated UE-location and the UE's current link quality parameters and accesses historical records using the estimated UE-location, where the historical records include surface configurations that have previously resulted in improved performance levels at the estimated UE-location.

In various implementations, the base station 120 communicates surface-configuration information to the APD 180 over the wireless link 133. As one example, the wireless link 133 operates as an adaptive phase-changing device slow-control channel (APD slow-control channel), where the base station transmits messages that indicate a surface configuration to the APD 180, similar to layer 2 or layer 3 control messages that communicate information using information elements (IEs). Alternatively or additionally, the wireless link 133 includes an adaptive phase-changing device fast-control channel (APD fast-control channel), where the base station indicates control information using signaling, sometimes on a slot-by-slot basis, for quick surface-configuration changes (e.g., surface configurations applied on a slot-by-slot basis). As one example, the base station 120 transmits an index into a surface-configuration codebook to indicate a phase vector as the surface configuration using the APD slow-control channel or the APD fast-control channel.

In various implementations, the APD control channels operate in different frequency bands than operating bands used for the base station-UE communications. For example, the base station communicates with the UE in a first operating frequency band (e.g., signals used for wireless link 131) such as above-6 GHz bands that are defined by the 3GPP LTE and 5G NR communication standards, and communicates with the APD using APD control channels in a second operating frequency band (e.g., signals used for wireless link 133) that is different from the first operating frequency band. For example, the base station 120 can communicate with the APD 180 using a frequency band that is lower than the frequency band the base station 120 uses to communicate with the UE 110. This can allow the base station 120 to maintain a communication link with the APD 180, and thereby control the APD 180, in channel conditions in which communication using a high frequency band is unreliable. In a particular implementation, the base station 120 communicates with the APD 180 using a sub-6 GHz band, and communicates with the UE 110 using an above-6 GHz band. In other aspects, the base station uses a same operating frequency band for both UE communications and APD communications.

Figure 5:
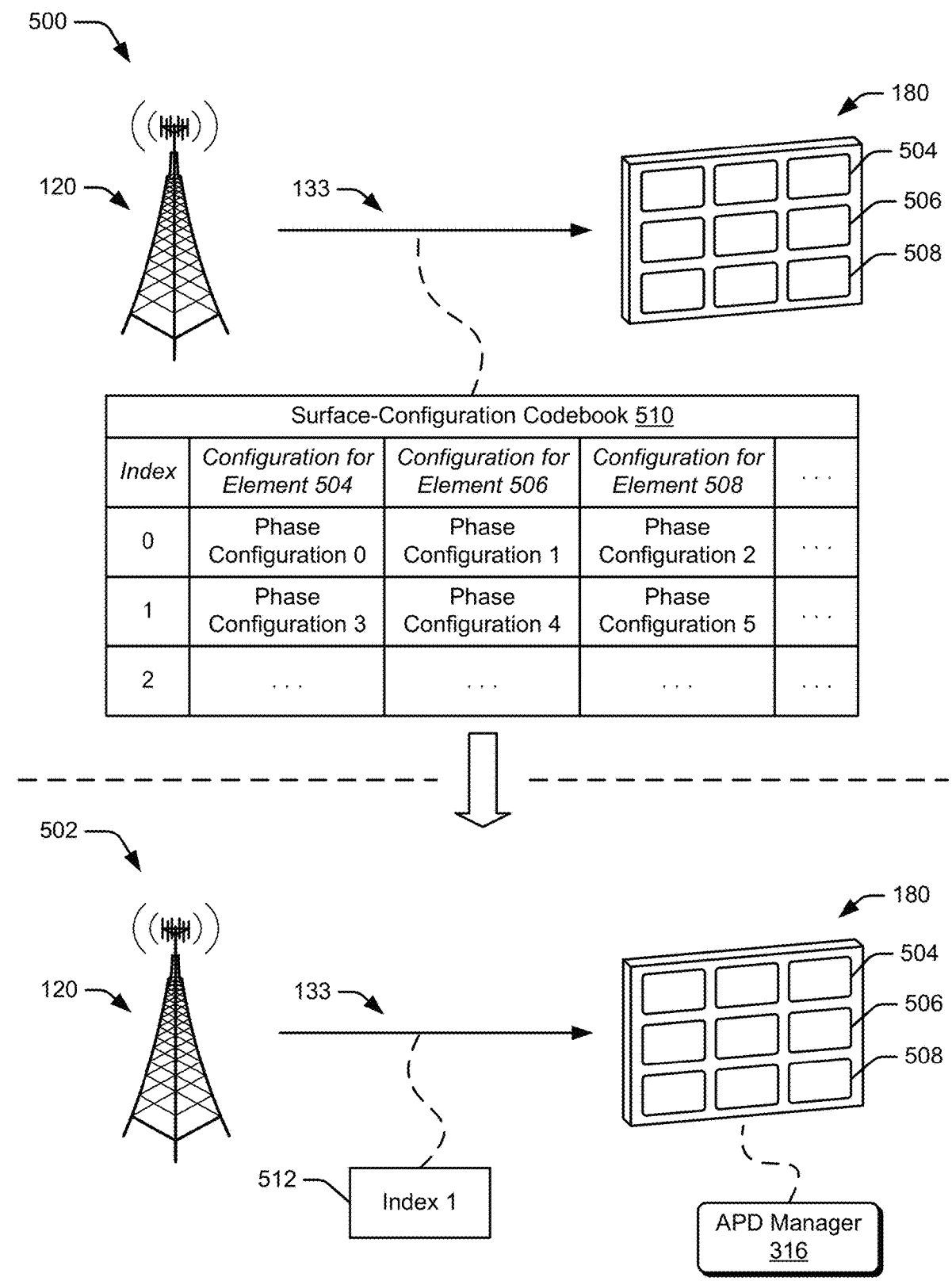
FIG. 5 illustrates an example environment in accordance with various implementations of position control of adaptive phase-changing devices.

FIG. 5 illustrates an example environment in which position control of adaptive phase-changing devices is implemented in accordance with various aspects. Environment 500 corresponds to the example environment at a first point in time, and environment 502 corresponds to the example environment at a second, arbitrary, later point in time. Thus, the environment 500 and the environment 502, collectively, illustrate aspects of position control of adaptive phase-changing devices in the example environment. The environments 500 and 502 include the base station 120 and the APD 180 of FIG. 1. As part of its RIS, the APD 180 includes an array of "N" configurable surface elements, such as configurable surface element 504, configurable surface element 506, configurable surface element 508, and so forth, where "N" represents the number of configurable surface elements of the RIS.

In implementations, the base station 120 transmits to the APD a surface-configuration codebook 510 using the wireless link 133, such as over an APD slow-control channel using one or more messages. In aspects, the base station 120 uses the APD slow-control channel to communicate large quantities of data, to communicate data without low-latency requirements, and/or to communicate data without timing requirements. At times, the base station 120 transmits multiple surface-configuration codebooks to the APD 180, such as a first surface-configuration codebook for downlink communications, a second surface-configuration codebook for uplink communications, a phase vector codebook, a beam-codebook, and so forth. In response, the APD 180 stores the surface-configuration codebook(s) 510 in CRM, which is representative of codebook(s) 314 in CRM 310 of FIG. 3. Alternatively, or additionally, the APD 180 obtains the surface-configuration codebooks through manufacturing or installation processes that store the surface-configuration codebook(s) 510 in the CRM of the APD 180 (e.g., CRM 310) during assembly, installation, or through an operator manually adding the codebook(s).

The surface-configuration codebook 510 includes configuration information that specifies a surface configuration for some or all of the configurable surface elements (e.g., elements 320) forming the RIS of the APD 180. To illustrate, in some aspects, a phase vector defines a set of waveform transformation properties (e.g., phase delay, reflection angle/direction, polarization, amplitude) that a configurable surface element applies to an incident signal (e.g., incident waveform, incident signal ray) to transform the incident signal into a reflected signal (e.g., reflected waveform, reflected signal ray) characterized by one or more transformed properties. With respect to the surface-configuration codebook 510, each configuration entry may correspond to a phase vector or surface configuration associated with a set of waveform transformation properties provided by a respective configurable surface element of an APD when configured with the phase vector or surface configuration.

A surface configuration may include (or indicate) a surface element hardware configuration (e.g., for one or more PIN diodes) for each configurable surface element of the APD. In aspects, each surface element hardware configuration of a surface configuration may correspond to a respective entry in a phase vector. In other words, each surface element hardware configuration arranges the surface of a respective configurable surface element such that the respective configurable surface element transforms an incident waveform into a reflected waveform with waveform properties indicated by the corresponding phase vector entry. This can include absolute transformations based on the phase vector (e.g., generate a reflected waveform to within a threshold value/standard deviation of waveform properties indicated by the phase vector) or relative transformations (e.g., generate a reflected waveform based on modifying the incident waveform with the waveform properties indicated by the phase vector) to within a threshold value/standard deviation of the waveform properties. As one example, each index of the codebook corresponds to a phase vector and configuration information for each configurable surface element of the APD 180. Index 0, for instance, maps phase configuration 0 to configurable surface element 504, phase configuration 1 to configurable surface element 506, phase configuration 2 to configurable surface element 508, and so forth. Similarly, index 1 maps phase configuration 3 to configurable surface element 504, phase configuration 4 to configurable surface element 506, phase configuration 5 to configurable surface element 508, and so forth. The surface-configuration codebook 510 can include any number of phase vectors that specify configurations for any number of configurable surface elements such that a first phase vector corresponds to a first surface configuration for the APD 180 (by way of configurations for each configurable surface element in the RIS), a second phase vector corresponds to a second surface configuration for the APD 180, etc.

While the surface-configuration codebook 510 of FIG. 5 includes phase vector information, alternative or additional codebooks store beam configuration information, such as a first surface configuration that specifies a first beam with a first (propagation) direction, a second surface configuration that specifies a second beam with a second direction, etc. To illustrate, and similar to a phase vector surface configuration codebook, a beam cookbook includes surface element hardware configurations that correspond to a respective beam configuration. In other words, each surface element hardware configuration arranges the surface of a respective configurable surface element such that the respective configurable surface element transforms an incident waveform into a reflected waveform with beam properties (e.g., direction) indicated in the beam-codebook. Thus, in various implementations, the surface-configuration codebook 510 corresponds to a beam-codebook. Similarly, to configure the surface of the APD 180, the base station determines the desired beam configuration for the transformed signal and identifies an entry in the beam-codebook corresponding to the desired beam configuration (e.g., by identifying a beam-codebook index that maps to the entry). In some aspects, a phase-sweeping codebook indicates a pattern of surface configurations and/or beam configurations, such as surface configurations and/or beam configurations as indicated by the surface-configuration codebook 510 and beam configurations specified by the beam-codebook. To illustrate, the phase-sweeping codebook indicates an order of surface configurations to cycle through. Alternatively, or additionally, the phase-sweeping codebook indicates a time duration for applying each surface configuration.

The surface-configuration information stored in a codebook can correspond to a full configuration that specifies an exact configuration (e.g., configure with this value) or a delta configuration that specifies a relative configuration (e.g., modify a current state by this value). In one or more implementations, the phase configuration information specifies a phase shift and/or phase adjustment between an incident signal and a transformed signal. For instance, the phase configuration 0 can specify a phase-shift configuration for element 504 such that the configurable surface element 504 transforms the incident waveform with a "phase configuration 0" relative phase shift.

In environment 502, the base station 120 communicates an indication 512 to the APD 180 that specifies a surface configuration. For example, the indication 512 specifies an index that maps to a corresponding surface configuration. In response to receiving the indication, the APD manager 316 retrieves the surface configuration from the surface-configuration codebook 510 using the index and applies the surface configuration to the RIS (e.g., configuring each configurable surface element with the configuration specified by the codebook).

In various implementations, the base station 120 communicates timing information (not illustrated) to the APD 180. For instance, the base station 120 sometimes indicates, to the APD 180 and using the wireless link 133, a start time for the application of an indicated surface configuration. In aspects, the base station 120 communicates a stop time that indicates when to remove and/or change the surface configuration. In changing the surface configuration, the APD 180 (by way of the APD manager 316) can apply a default surface configuration, return to a previous surface configuration (e.g., a surface configuration used prior to the indicated surface configuration), and/or apply a new surface configuration. To maintain synchronized timing with the base station 120, the APD 180 receives and/or processes a base station synchronizing signal.

By specifying the timing information, the base station 120 can synchronize and/or configure the APD 180 to a particular UE (e.g., UE 110) even when the UE is moving. For example, the base station 120 configures the APD 180 to correct for channel impairments identified for the particular UE by specifying start and stop times that correspond to a time slot assigned to the particular UE. In aspects, the base station 120 transmits surface-configuration indications and/or timing information using an APD fast-control channel, which allows the base station 120 to dynamically configure the APD 180 on a slot-by-slot basis. For example, the base station 120 transmits a surface-configuration schedule to the APD that indicates when to apply different surface configurations to the RIS/configurable surface elements. Alternatively, or additionally, the base station 120 communicates surface configuration changes on a slot-by-slot basis using signaling on the APD fast-control channel. These allow the base station to configure the APD for multiple UEs, such as in scenarios where different UEs are assigned different time slots or different numerologies and improve data rates, spectral efficiency, data throughput, and reliability for the multiple UEs and the corresponding wireless network.

Figure 6:
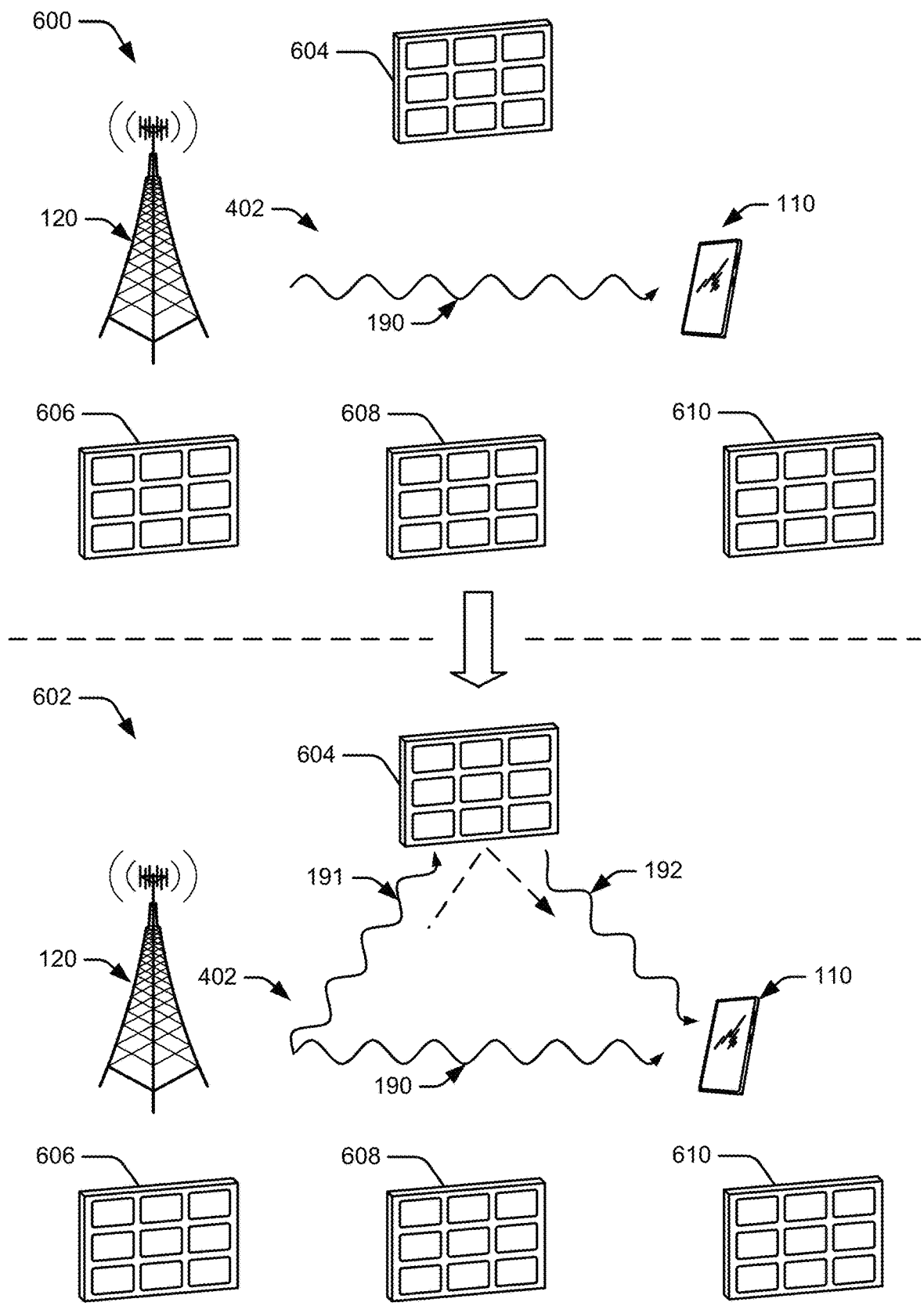
FIG. 6 illustrates an example environment in accordance with various implementations of position control of adaptive phase-changing devices.

FIG. 6 illustrates an example environment in which position control of adaptive phase-changing devices is implemented in accordance with various aspects. Environment 600 corresponds to the example environment at a first point in time, and environment 602 corresponds to the example environment at a second, arbitrary, later point in time. Thus, the environment 600 and the environment 602, collectively, illustrate aspects of position control of adaptive phase-changing devices in the example environment.

The environments 600 and 602 include the base station 120 and the UE 110 of FIG. 1, where the base station 120 and the UE 110 exchange communications (e.g., user-plane data, control-plane information) using wireless signal 402 of FIG. 4 to implement portions of the wireless link 131 of FIG. 1 that, at times, includes channel reciprocity. The environment 600 also includes multiple APDs, labeled as APD 604, APD 606, APD 608, and APD 610, where each APD represents an instance of APD 180 of FIG. 1. In the environment 600, the wireless signal 402 includes the signal ray 190, which propagates towards the UE 110 in a line-of-sight manner.

In one or more aspects, the base station 120 determines to utilize one or more APDs in the communication path with the UE 110 to mitigate channel conditions that degrade the wireless signal 402. For example, the base station 120 receives downlink quality parameters from the UE 110 and/or generates uplink quality parameters that indicate various signal and/or location characteristics about the UE, such as downlink/uplink RSSI, power information, SINR information, CQI, CSI, Doppler feedback, BLER, QoS, HARQ information, timing measurements, error metrics, etc. To illustrate, the base station 120 identifies an estimated UE-location and determines the UE 110 has moved into a location with known problematic channel conditions, such as an urban canyon or a location with multiple competing electronic devices. Alternatively, or additionally, the base station 120 identifies that a signal quality of the wireless signal 402 (received at the UE 110) does not meet an acceptable performance threshold and/or that the signal quality has degraded below or is trending downward toward the acceptable performance threshold.

In another aspect, the UE 110 uses the link quality measurement to determine when to request the use of an APD in the communication path. For example, the UE 110 identifies when signal quality has degraded below an acceptable performance threshold by analyzing the link quality parameters. The UE 110 then generates and sends a request to the base station 120, such as a request to utilize an APD in the communication path and/or a request to reconfigure an existing APD.

In some implementations, the base station 120 obtains APD capabilities (e.g., a number of configurable surface elements, a configuration bit-resolution for the configurable surface elements, supported APD codebooks) and selects an APD to utilize in the communication path with the UE based on the APD capabilities. Alternatively, or additionally, the base station determines a surface configuration based on the APD capabilities. For example, the base station sends a request to an APD using a (downlink) APD slow-control channel for the APD capabilities. In response to the query, the APD (e.g., APD 180) transmits the APD capabilities to the base station 120, such as through control messages using an uplink APD slow-control channel. As another example, the base station 120 queries a server for APD capabilities, such as a server included in the core network 150 of FIG. 1. As yet another example, the base station broadcasts a request for APD capabilities, and APDs that receive the broadcast message return their APD capabilities.

In the environment 602, the base station 120 determines to utilize APD 604 in the communication path with the UE 110, such as based on an estimated UE-location of the UE 110, based on link quality parameters, and/or based on APD capabilities of the APD 604. In various implementations, the base station 120 determines APD location information for each of the APDs 604, 606, 608, and 610, such as by querying a server or function included in the core network 150 for the APD location information. In implementations, the base station 120 compares each APD location to a distance threshold to identify an APD a certain minimum distance from the estimated location of UE 110. Alternatively, or additionally, the base station 120 identifies an APD (using APD capabilities) with characteristics that best mitigate identified problems, such as an APD well-positioned to transform the wireless signal and/or direct the transformed wireless signal to the UE 110.

After selecting an APD to utilize in the communication path (e.g., APD 604), the base station 120 communicates a surface configuration to the APD, such as that described with reference to FIG. 5, and configures the wireless signal 402 to include the signal ray 191 that propagates towards a surface of the APD 604. For instance, assume that the wireless signal 402 corresponds to a beamformed signal. In some aspects, the base station 120 adjusts a spatial area covered by the wireless signal and/or changes a transmission direction of the wireless signal such that the signal ray 191 propagates towards the APD 604. As further described, the signal ray 191 strikes the RIS of the APD 604 and transforms into the signal ray 192 based on the surface configuration. The signal ray 192 and the attenuated signal ray 190 may then combine at the receiver of the UE 110 as further described.

While the environment 602 illustrates that the base station communicates with the UE 110 using a first signal ray (e.g., signal ray 190) that propagates directly towards the UE 110 and a second signal ray (e.g., signal ray 191) that propagates towards the APD 180, in alternative implementations, the base station 120 communicates with the UE 110 using only a signal ray that propagates towards the APD 604. As one example, the signal ray 190 may encounter an obstruction that prevents the signal ray from reaching the UE 110. As another example, the base station 120 selects a beam direction towards the APD 604 and a beam-width that may or may not propagate signal rays towards the UE 110. Thus, the base station 120 sometimes communicates with the UE 110 using (only) reflected signals off the surface of the APD 180. Additionally, multiple APDs may be selected and, for example, additional rays equivalent to 191 (not shown) may be transmitted toward APD 608 and transformed to rays equivalent to 192 (not shown) to constructively interfere at the UE 110 with the rays 192 from APD 604.

Base station control of an APD for use in communication paths between devices helps improve signal quality, such as by reducing multi-path fading at a receiver (e.g., at a UE for downlink communications, at a base station for uplink communications). By using feedback that characterizes a current transmission environment (e.g., link quality parameters), a base station can modify a surface of the APD to correct for errors identified by the feedback, sometimes in real time and/or for multiple UEs on a slot-by-slot basis. The link quality parameters allow a base station and/or UE to identify when a transmission environment changes, such as due to a UE moving to a different location, a change in weather, or an obstruction moving into a communication path. By controlling a surface configuration of an APD, the base station can correct for changes that degrade signal quality by improving a received signal quality through the addition of a signal transformed by the APD. This subsequently improves data rates, data throughput, and reliability in the system.

Signaling and Control Transactions for Configuring a RIS

Figure 7:
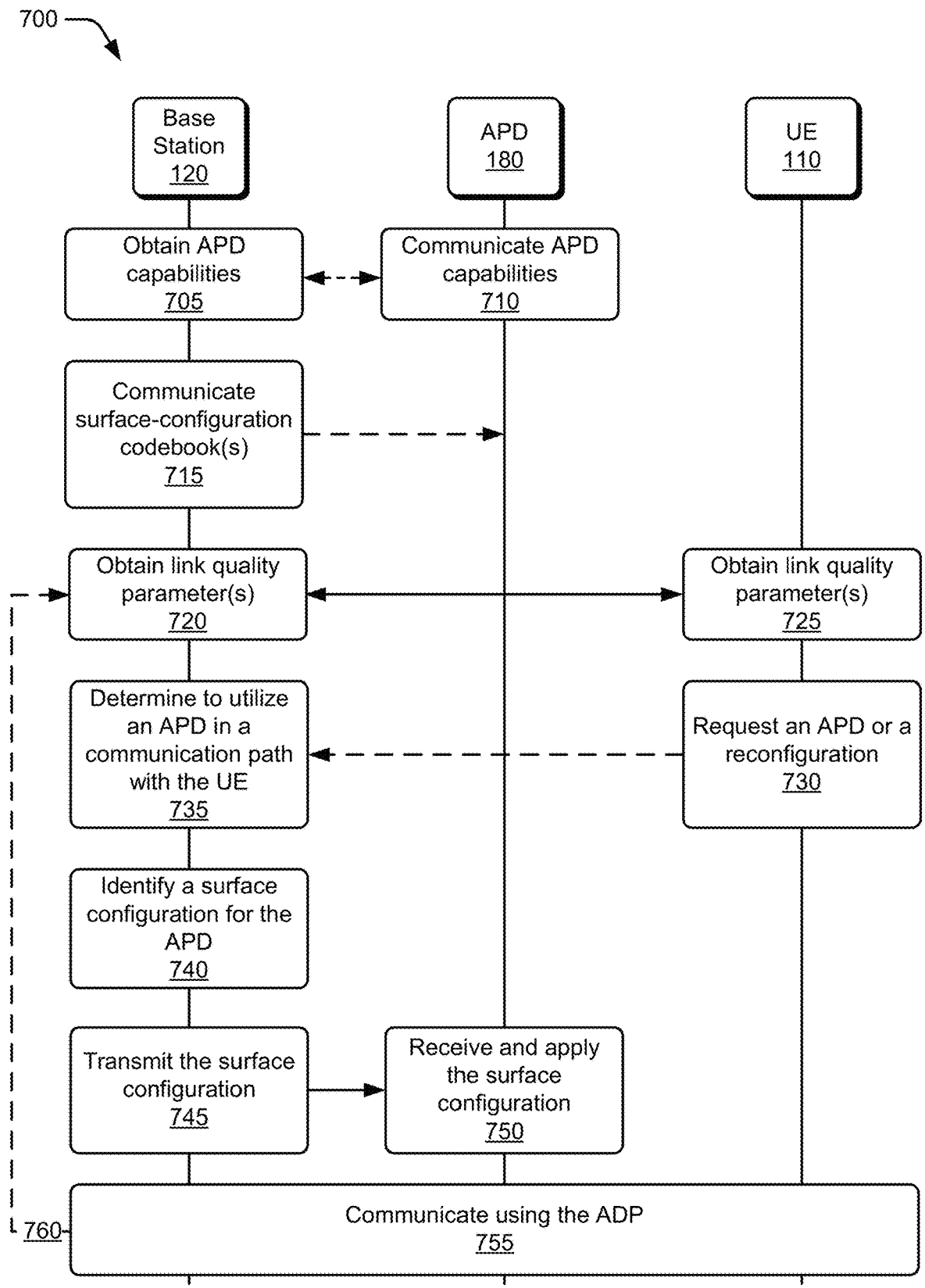
FIG. 7 illustrates a signaling and control transaction diagram between various network devices in accordance with one or more aspects of position control of adaptive phase-changing devices.

FIG. 7 illustrates an example signaling and control transaction diagram 700 between various network entities, such as the base station 120, the UE 110, and the APD 180, in accordance with aspects of position control of adaptive phase-changing devices. The base station 120, the APD 180, and the UE 110 may be implemented in a manner similar to the entities described with reference to FIGS. 1-6.

Optionally, at 705, the base station 120 obtains APD capabilities. For example, in some implementations, the base station sends a request to multiple APDs using a (downlink) APD slow-control channel for the APD capabilities (e.g., a number of configurable surface elements, a configuration bit-resolution for the configurable surface elements, supported APD codebooks) using control message(s) and/or IEs included in the control message(s). Alternatively, or additionally, the base station 120 queries a server for APD capabilities, such as a server included in the core network 150 of FIG. 1. In various implementations, the base station 120 identifies the multiple candidate APDs by querying the core network for APDs within a cell service area of the base station.

In response to receiving a request for the APD capabilities, one or more APDs (e.g., APD 180) communicate the APD capabilities to the base station 120 at 710. For example, the APD(s) communicate the APD capabilities over an uplink APD slow-control channel using control messages and/or IEs.

At 715, the base station 120 optionally communicates one or more APD codebooks to one or more APDs, such as a single APD identified based on an estimated UE-location of the UE 110 and/or the multiple candidate APDs identified at 705. In various implementations, the base station transmits the surface-configuration codebook(s) over an APD slow-control channel, such as that described with reference to the environment 500 of FIG. 5. The surface-configuration codebook(s) can include any suitable type of surface-configuration information, such as phase vectors and/or beam configurations.

Generally, the base station 120 can obtain the APD capabilities (as described at 705) and/or communicate the surface-configuration codebook(s) (as described at 715) at any suitable point in time. In some implementations, the base station 120 obtains the APD capabilities and/or communicates the surface-configuration codebook(s) in response to identifying a current or changed UE-location (e.g., a UE has moved, a UE has attached to the base station). In response to identifying the new UE-location, the base station 120 queries APDs (e.g., a broadcast message, APD-specific messages) and/or a server included in the core network, for APD capabilities of APDs within a pre-determined distance of the new location. Alternatively, or additionally, the base station communicates the surface-configuration codebooks to APDs within the pre-determined distance of the new location.

As yet another example, the base station 120 requests and/or queries for APD capabilities after determining to utilize an APD in a communication path with a UE and/or identifying particular APD(s) to utilize in the communication path. After determining to utilize the APD(s) (or identifying the particular APDs), the base station 120 alternatively or additionally communicates the surface-configuration codebook(s) to the APDs. However, the base station can also obtain the APD capabilities and/or communicate the codebook(s) based on other factors, such as in response to receiving updated APD codebook(s) from the core network and/or in response to receiving a command from the core network to obtain APD capabilities. Thus, the ordering of these signaling and control transactions described at 705, at 710, and at 715 is not intended to be limiting.

At 720, the base station 120 obtains link quality parameters. In one or more implementations, the base station receives downlink quality parameters from the UE 110. As another example, the base station generates uplink quality parameters. In some scenarios, the base station determines, using the link quality parameters or a UE report of its position, an estimated UE-location of the UE 110, and accesses and analyzes historical records that indicate signal measurements and/or link quality parameters reported by the same or other UEs within a pre-determined distance of the estimated UE-location. The base station can obtain any type or combination link quality parameter(s), such as downlink/uplink RSSI, power information, SINR information, CQI, CSI, Doppler feedback, BLER, QoS, HARQ information, timing measurements, error metrics, etc. At times, the base station obtains a surface configuration, such as from historical records that include surface-configuration information used by various APDs within the pre-determined distance of the estimated UE-location.

Similarly, at 725, the UE optionally obtains link quality parameters. In aspects, the UE generates the downlink quality parameters, such as those received by the base station at 720, and/or receives the uplink quality parameters generated by the base station at 720.

At 730, the UE 110 optionally requests to utilize an APD in the communication path with the base station or requests a surface reconfiguration of a current APD in the communication path. To illustrate, the UE APD manager 220 of FIG. 2 analyzes the link quality parameters received and/or generated at 725. Based on the analysis of the link quality parameters, the UE 110 requests to utilize an APD in the communication path or requests a surface reconfiguration, such as when the link quality parameters indicate a channel impairment as further described.

At 735, the base station determines to utilize one or more APDs in a communication path with the UE 110. For instance, as described with reference to FIG. 6, the base station 120 determines that one or more link quality parameters (e.g., uplink quality parameters, downlink quality parameters) have fallen below an acceptable performance threshold and/or level. Alternatively, or additionally, the base station determines that the link quality parameter(s) indicate a channel impairment. In aspects, the base station determines to utilize APD(s) in a communication path between the base station and UE based on an estimated UE-location. For example, the base station identifies that the UE has moved to a location with a history of channel impairment(s), such as by analyzing historical records with signal measurements and/or link quality parameters from the same or other UEs at the estimated UE-location.

In determining to utilize an APD in the communication path, the base station sometimes identifies a particular APD to use, such as by using an estimated UE-location obtained using link quality parameter(s) at 720 to identify an APD within a pre-determined distance of the estimated UE-location. Alternatively, or additionally, the base station 120 identifies the APD based on the APD capabilities of the APD, such as by selecting an APD, from multiple candidate APDs, that includes the highest number of configurable surface elements, has the largest configurable surface area, or has a surface angle best suited to reach a target device (e.g., UE 110).

At 740, the base station 120 identifies a surface configuration for the APD identified at 735 (e.g., APD 180). To illustrate, as described with reference to FIG. 6, the base station 120 analyzes downlink quality parameters from the UE 110 and/or uplink quality parameters. Alternatively, or additionally, the base station 120 analyzes historical records with link quality parameters and/or signal measurements from the same or other UEs at an estimated UE-location. Based on the analysis, the base station 120 selects a surface configuration directed towards correcting the channel impairments, such as by analyzing a codebook and selecting a surface configuration (e.g., a phase vector) that transforms various wireless signal characteristics (e.g., phase characteristics, amplitude characteristics, polarization characteristics), and so forth, that strike the RIS of the APD. At times, the base station 120 selects the surface configuration from historical records as further described.

At 745, the base station 120 transmits an indication of the surface configuration to the APD 180. For instance, as described with reference to the environment 502 of FIG. 5, the base station 120 indicates an index value of a codebook (e.g., a surface-configuration codebook index, a beam-codebook index) by transmitting the indication using an APD slow-control channel (e.g., control messages and/or IEs) or an APD fast-control channel (e.g., signaling). In some implementations, the base station 120 communicates timing information on when to start applying the surface configuration and/or when to stop applying the surface configuration. At times, the base station 120 determines the timing information based on an estimated UE-location and/or estimated UE-velocity, such as in a scenario where a UE temporarily moves within range of the APD and then out-of-range of the APD. The base station 120 communicates timing information such that the APD applies the surface configuration at times the UE operates within range of the APD. Alternatively or additionally, the base station 120 indicates the surface configuration on a slot-by-slot basis and/or timing information on the slot-by-slot basis, such as by indicating to apply a first surface configuration during a first time slot, a second surface configuration during a second time slot, and so forth, such as in scenarios in which the base station 120 services multiple UEs and configures the APD for the multiple UEs (e.g., a first APD configuration for a first time slot assigned to a first UE, a second APD configuration for a second time slot assigned to a second UE). In one aspect, the base station 120 implicitly directs the APD 180 to apply the surface configuration by sending the surface configuration (e.g., sending an index into a surface-configuration codebook 510). In other words, the APD 180 implicitly receives a direction to apply the surface configuration by receiving the indication of the surface configuration. In another aspect (not illustrated), the base station 120 explicitly directs the APD 180 to apply the surface configuration, either by setting a field or flag in the same message used to send the surface configuration or by explicitly sending a separate indication that alternatively or additionally includes other configuration settings, such as start and/or stop times to apply the surface configuration.

At 750, the APD 180 receives and applies the surface configuration, such as by using an indicated index to retrieve the surface configuration from an APD codebook. As further described, the APD 180 sometimes applies the surface configuration based on timing information included in the indication transmitted at 745 and/or included in a separate, second indication.

The base station 120 and the UE 110 communicate using the APD at 755. In one or more implementations, the base station 120 transmits at least a portion of a first downlink wireless signal (e.g., signal ray 191) towards the surface of the APD, and the RIS of the APD transforms the portion of the first downlink wireless signal into a second downlink wireless signal (e.g., signal ray 192) using the surface configuration indicated at 745 and applied at 750. Alternatively or additionally, the UE transmits at least a portion of a first uplink wireless signal towards the RIS of the APD, and the RIS transforms the portion of the first uplink wireless signal into a second uplink wireless signal using the surface configuration indicated at 745 and applied at 750.

In some implementations, the process iteratively repeats, as indicated at 760 with a dashed line that returns to the diagram 700 at 720. To illustrate, consider an example in which the current operating environment continuously changes, such as by the UE 110 moving into a location with channel impairments or an object moving into a communication path. In evaluating these changes, such as through link quality parameters received from the UE 110 and/or generated by the base station 120 (e.g., at 720 of FIG. 7), the base station 120 determines to select a new APD to utilize in the communication path (e.g., at 735) and/or determines a new surface configuration for an RIS of the APD (e.g., at 740). This provides the base station 120 with an ability to dynamically improve the system performance by reconfiguring a surface configuration of an APD and/or selecting a new APD to utilize in the communication path(s).

Example Methods for Configuring an RIS

Example methods 800 and 900 are described with reference to FIGS. 8 and 9 in accordance with one or more aspects of position control of adaptive phase-changing devices. The order in which the method blocks are described are not intended to be construed as a limitation, and any number of the described method blocks can be skipped or combined in any order to implement a method or an alternative method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 8:
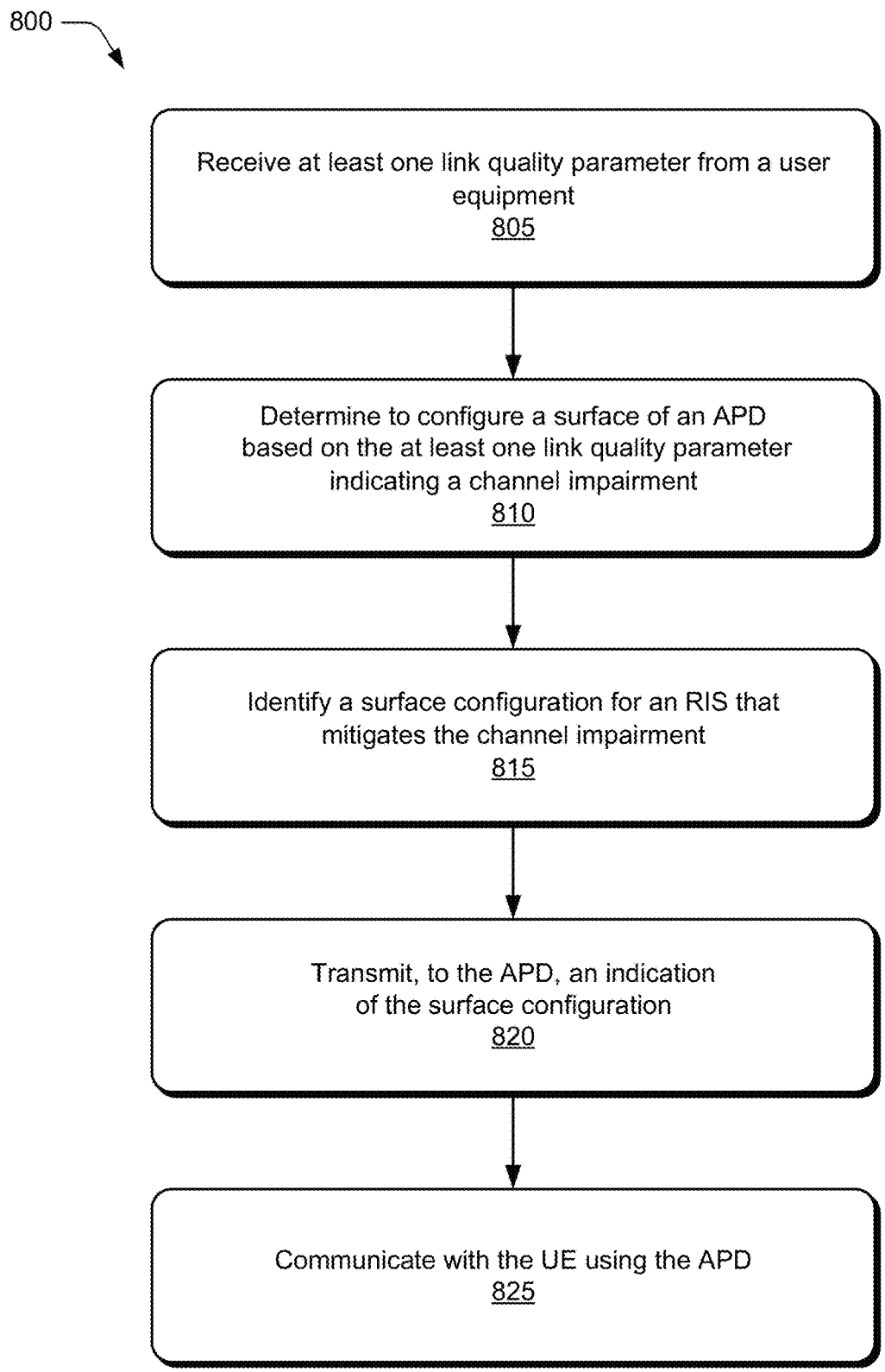
FIG. 8 illustrates an example method for position control of adaptive phase-changing devices in accordance with one or more aspects.

FIG. 8 illustrates an example method 800 for position control of adaptive phase-changing devices. In some implementations, operations of method 800 are performed by a base station, such as base station 120, as illustrated in FIGS. 1, 2, and/or 4 to 7.

At 805, a base station receives at least one link quality parameter from a UE. For example, the base station (e.g., base station 120) receives at least one link quality parameter from the UE (e.g., the UE 110) as described at 720 of FIG. 7. Alternatively, or additionally, the base station generates link quality parameters based on communications with the UE 110. Depending on circumstances, the link quality parameter may relate to a line-of-sight wireless link 132 between the UE 110 and the base station 120, or may relate to a non-line-of-sight wireless link 131 between the UE 110 and the base station 120 that uses the APD 180.

At 810, the base station determines to configure a surface of the APD based on the at least one link quality parameter indicating a channel impairment. For example, the base station (e.g., base station 120) determines to configure the APD (e.g., APD 180) based on analyzing one or more link quality parameters (e.g., downlink quality parameters, uplink quality parameters, historic link quality parameters) associated with the UE (e.g., UE 110), and determining that at least one link quality parameter indicates a channel impairment and/or does not meet an acceptable performance threshold as described with reference to FIG. 6 and/or as described at 735 of FIG. 7. In determining to configure the surface of the APD, the base station sometimes determines to utilize the APD in the communication path, such as in scenarios in which an APD was not previously utilized. Alternatively, or additionally, the base station determines to configure the APD based on receiving a request from the UE to utilize an APD in the communication path.

In some implementations, the base station identifies, using the link quality parameters, an estimated UE-location and selects the APD to configure based on the estimated UE-location. In aspects, the base station 120 analyzes historical records and determines that the estimated UE-location has a history of channel impairments and/or poor signal quality without the use of an APD. The base station then determines to utilize an APD in the communication path based on the history of the estimated UE-location. In various implementations, the base station 120 identifies a particular APD to utilize in the communication path with the UE, such as by selecting an APD with a location that resides within a predetermined distance of the estimated UE-location or an APD with particular APD capabilities (e.g., a number of configurable surface elements, a configuration bit-resolution for the configurable surface elements, supported APD codebooks).

At 815, the base station identifies a surface configuration for an RIS of the APD that mitigates the channel impairment indicated at 810. For example, the base station (e.g., base station 120) identifies a phase vector in a surface-configuration codebook (e.g., surface-configuration codebook 510) based on the link quality parameters as described at 740 of FIG. 7. The base station 120 sometimes identifies a surface configuration that configures the RIS to modify and/or transform the signal characteristics of a wireless signal (e.g., a downlink wireless signal, an uplink wireless signal) propagated between the base station and the UE, such as one or more phase characteristics, one or more amplitude characteristics, or both.

In various implementations, the base station transmits the surface-configuration codebook to the APD using the APD control channel, such as that described with reference to the environment 500 of FIG. 5. Alternatively, or additionally, in identifying the surface configuration, the base station determines timing information, such as a start time to apply the surface configuration and/or a stop time to stop using the surface configuration.

At 820, the base station transmits, to the APD, an indication of the surface configuration. To illustrate, the base station (e.g., base station 120) transmits, to the APD (e.g., APD 180), a codebook index that maps to the surface configuration and/or phase vector as described with reference to the environment 502 of FIG. 5 and/or at 745 of FIG. 7. Alternatively, or additionally, the base station transmits the timing information to the APD. This can include transmitting the indication of the surface configuration and/or the timing information using signaling on an APD fast-control channel, such as in scenarios in which the base station communicates the surface configuration and/or timing information on a slot-by-slot basis. Alternatively, or additionally, the base station transmits the indication using a control message transmitted over an APD slow-control channel. The base station 120 sometimes transmits indications of the surface configuration and the timing information together (in a same communication), while other times, the base station 120 transmits the indications separately (in separate communications).

At 825, the base station communicates with the UE using the APD. For example, the base station (e.g., base station 120) communicates downlink information to the UE (e.g., UE 110) by transmitting at least a portion of a downlink wireless signal (e.g., signal ray 191) towards the surface of the APD (e.g., APD 180). As another example, the base station (e.g., base station 120) receives at least a portion of an uplink wireless signal from the surface of the APD (e.g., APD 180). In various implementations, the wireless signals used to communicate with the UE, such as wireless signal 402, reside in a first operating frequency band, and the APD control channel(s) reside in a second operating frequency band that is different from the first operating frequency band.

Figure 9:
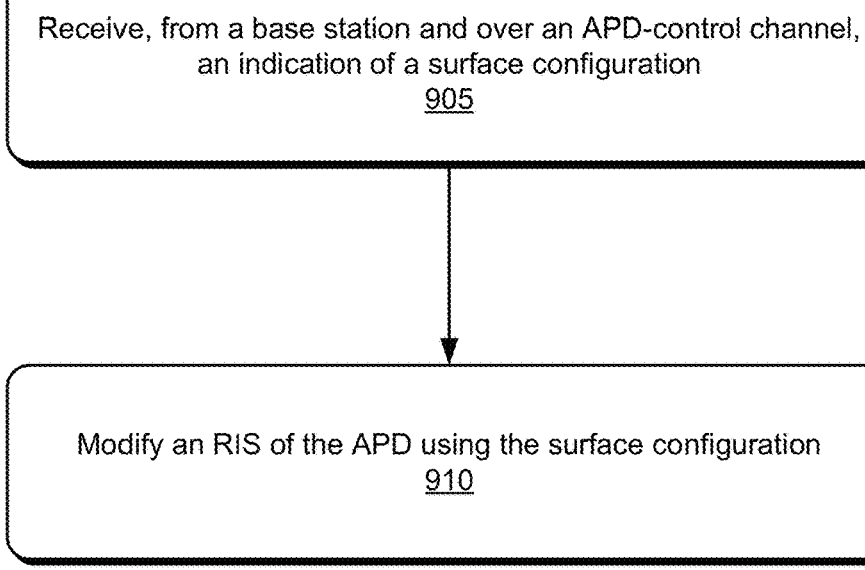
FIG. 9 illustrates an example method for position control of adaptive phase-changing devices in accordance with one or more aspects.

FIG. 9 illustrates an example method 900 in accordance with various aspects of position control of adaptive phase-changing devices. In some implementations, operations of method 900 are performed by an APD, such as APD 180 of FIG. 1.

At 905, an APD receives, from a base station and over an APD control channel, an indication of a surface configuration. Alternatively or additionally, the APD receives position configuration information (e.g., with the surface configuration indication, instead of the surface configuration indication, as part of the surface configuration indication). For example, the APD (e.g., APD 180) receives the indication from the base station (e.g., base station 120) over an APD slow-control channel or an APD fast-control channel (e.g., wireless link 133) as described in the environment 502 of FIG. 5 and at 750 of FIG. 7. To illustrate, the APD receives an indication of an index to a surface-configuration codebook (e.g., surface-configuration codebook 510) in a control message and using an APD slow-control channel. As another example, the APD receives the indication of the index using signaling over an APD fast-control channel. In some implementations, the APD receives an indication of a phase vector (e.g., indication 512). Alternatively, or additionally, the APD receives timing information and modifies the surface based on the timing information, such as a start time that indicates when to begin applying the surface configuration to the APD and/or a stop time that indicates when to stop applying the surface configuration to the APD.

At 910, the APD modifies a reconfigurable intelligent surface (RIS) of the APD using the surface configuration. For example, as described at 750 of FIG. 7, the APD (e.g., APD 180) modifies the RIS of the APD by using the index to access a surface-configuration codebook (e.g., surface-configuration codebook 510) to retrieve a phase vector. In implementations, the APD applies the phase vector to the RIS by configuring multiple configurable surface elements based on the phase vector. Alternatively, or additionally, the APD then transforms an incident signal that strikes the modified RIS of the APD, where the transformed wireless signal is directed to a user equipment (UE). In some aspects, the APD alternatively or additionally modifies the APD position as further described.

Position Control of APDs

Moving UEs can negatively impact the efficacy of the APD and/or an applied first surface configuration. In some aspects, a base station can quickly reconfigure an RIS using the APD fast-control channel to mitigate channel impairments caused by the UE moving. Alternatively, or additionally, the base station reconfigures a physical position of an APD using the APD fast-control channel and/or the APD slow-control channel to help mitigate changing channel impairments.

In one or more aspects, a base station modifies a position of an adaptive phase-changing device (APD). A base station identifies one or more characteristics of a user equipment (UE), such as an estimated UE-location. The base station then determines a position configuration for the APD by analyzing the link quality parameters. For instance, the base station determines rotational and/or linear adjustments. In aspects, the base station communicates the position configuration to the APD and directs the APD to update the position using the position configuration.

In one or more aspects, an adaptive phase-changing device (APD) modifies a position of the APD (e.g., a physical position, location, and/or orientation of the APD). The APD receives, from a base station and over an APD control channel, a first indication of a position configuration and a second indication to update the position using the position configuration. The APD then modifies the position of the APD using the position configuration, such as by communicating the position configuration to a motor controller.

Figure 10:
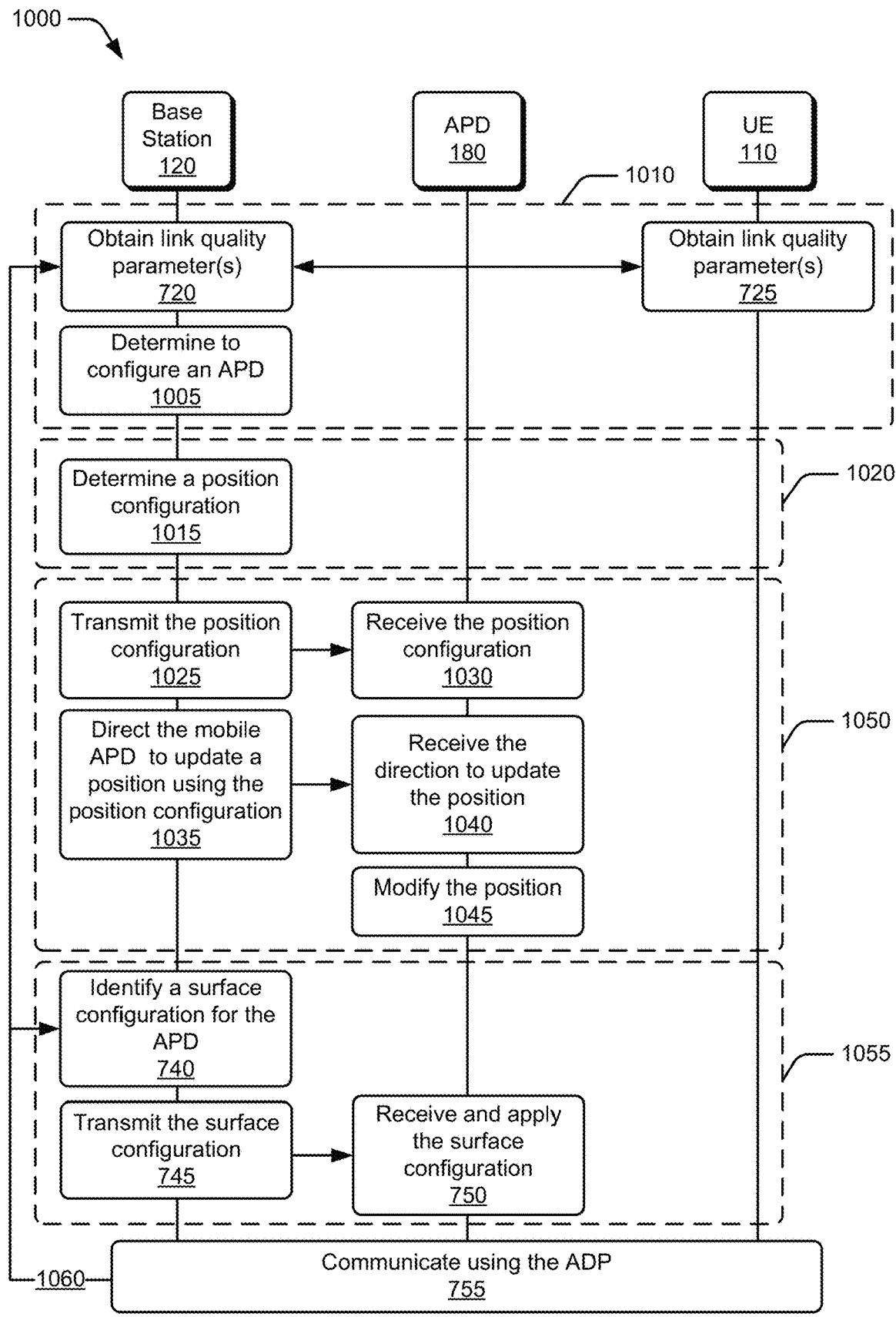
FIG. 10 illustrates a signaling and control transaction diagram between various network devices in accordance with one or more aspects of position control of adaptive phase-changing devices.
Figure 11:
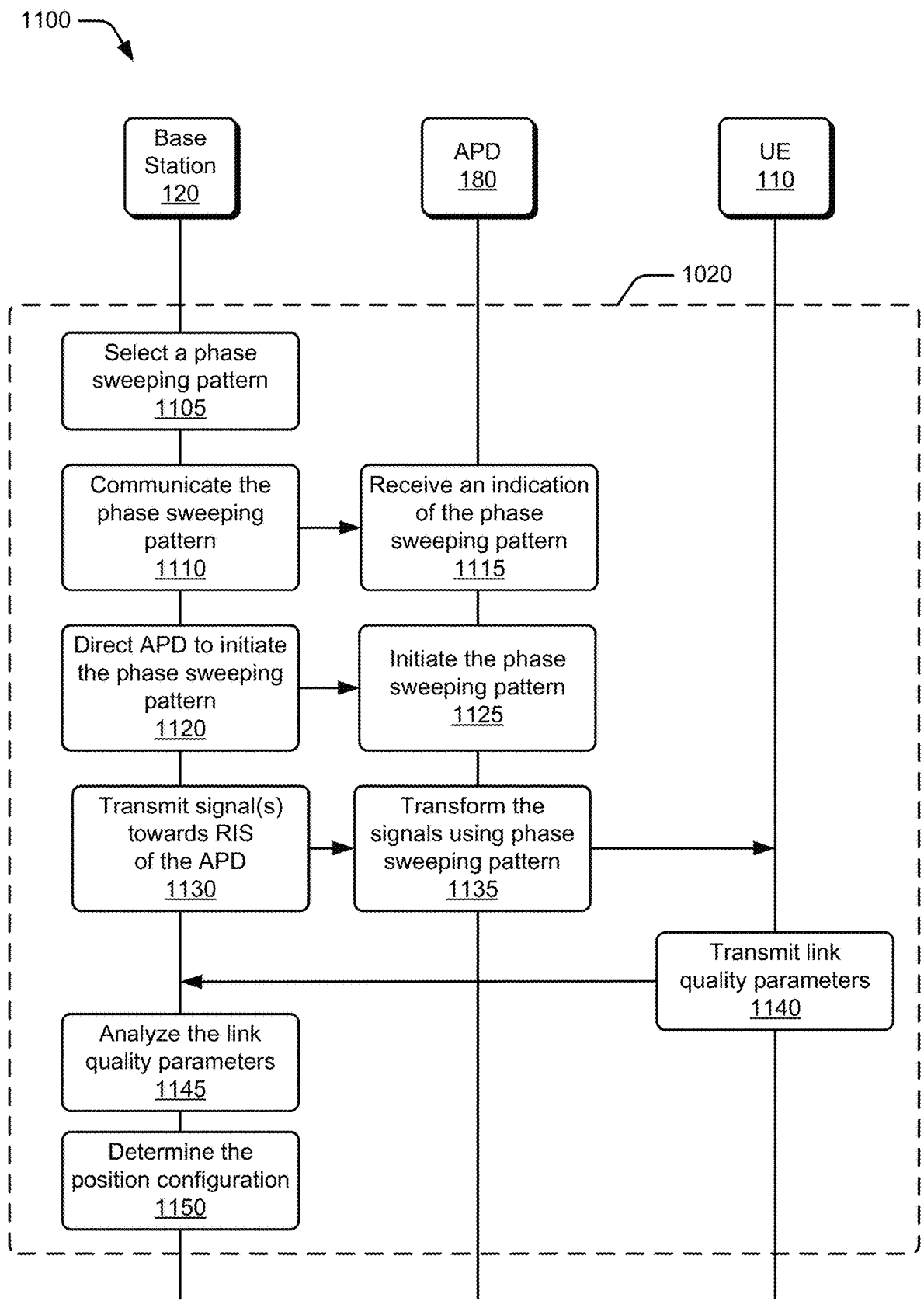
FIG. 11 illustrates a signaling and control transaction diagram between various network devices in accordance with one or more aspects of position control of adaptive phase-changing devices.

FIGS. 10 and 11 illustrate example signaling and control transaction diagrams 1000 and 1100, respectively, between various network entities, such as the base station 120, APD 180, and the UE 110 of FIG. 1 in accordance with aspects of position control of APDs. The base station 120, the APD 180, and the UE 110 may be implemented similar to the entities described with reference to FIGS. 1-9. For instance, the APD 180 can, at times, be mounted to a rail-propulsion system, a drone, and so forth, that provide mobility to the APD 180 when driven by a motor. In various aspects, the diagrams 1000 and 1100 operate in conjunction with diagram 700. While the diagrams 1000 and 1200 illustrate interactions with a single UE and a single APD, alternative or additional aspects of position control for APDs use multiple APDs to service one or more UEs, such as that described with reference to FIGS. 13-16.

A first example of signaling and control transactions for APD control is illustrated by the signaling and control transaction diagram 1000 of FIG. 10. As described with reference to FIG. 7, the base station 120 obtains link quality parameters at 720 and the UE 110 obtains link quality parameters at 725. This can include any combination of downlink quality parameters from the UE 110, uplink quality parameters generated by the base station 120, and/or link quality parameters obtained from historical records as further described.

At 1005, the base station 120 identifies one or more characteristics of the UE. For example, the base station analyzes the link quality parameters and identifies an estimated UE-location and/or an estimated UE-velocity. In some aspects, the base station determines, from the estimated UE-location and/or an estimated UE-velocity, that the UE has moved, or is moving, to a location with known problematic channel conditions, such as an urban canyon or a location with multiple competing electronic devices. Alternatively, or additionally, obtaining the link quality parameters and/or identifying the one or more characteristics includes multiple interactions with multiple APDs and/or the UE 110, further indicated in the diagram 1000 with sub-diagram 1010. For example, with reference to FIG. 14, the base station 120 obtains multiple link quality parameters from multiple UEs.

At 1015, the base station 120 determines a position configuration for an APD (e.g., APD 180). To illustrate, the base station accesses historical records based on the estimated UE-location and identifies the estimated UE-location has a history of blocked radio waves. The base station 120 then determines rotational adjustment(s) and/or linear adjustment(s) for the APD 180 that, when applied at the APD 180, mitigate the blocked radio waves. Alternatively, or additionally, the base station 120 accesses historical records to identify past position configurations used for similar link quality parameters.

As another example, the base station 120 determines, using the estimated UE-location and/or the estimated UE-velocity, a position configuration that includes at least a linear adjustment to move the APD 180 in a direction and/or speed based on the estimated UE-velocity.

In some aspects, the base station 120 includes a machine-learning algorithm trained to identify positional configurations based on link quality parameters. As one example, the base station 120 includes a deep neural network (DNN) trained to receive input link quality parameters and output position configuration(s) for one or more APDs. To illustrate, consider an example in which the base station 120 receives RSRP and/or SINR from the UE 110. The base station 120, by way of the machine-learning algorithm, moves the APD 180 in a direction that improves these metrics, such as through linear and/or rotational adjustments.

The base station and/or a core network (e.g., the core network 150) trains the DNN offline using known input data. Alternatively, or additionally, the base station and/or core network trains the machine-learning algorithm using input data obtained from current, real-time communication exchanges with the UE. Whether obtained offline or in real-time, the input data reflects various combinations of the link quality parameters. This can include using input data obtained from a single UE or using input data obtained from multiple UEs. To illustrate, the base station 120 inputs link quality data obtained from multiple UEs as further described with reference to FIG. 13, and the DNN performs a statistical analysis of the link quality parameters to identify a position configuration (for a single APD or multiple APDs) that mitigates channel conditions for the single UE or the multiple UEs, such as by averaging link quality parameters. Based on training, the DNN selects position configuration(s) to maximize cell capacity better than other position configurations and/or mitigate channel conditions. This includes selecting position configuration(s) for multiple APDs that improve channel quality for a single UE or multiple UEs.

Determining the position configuration at 1015 includes determining the efficacy of the APD at a current position and/or using particular surface configurations, further indicated in the sub-diagram 1020. As one example, the base station analyzes link quality parameters to determine a received signal strength to determine a path loss between the base station and the UE based on the current position of the APD. If the path loss exceeds an acceptable performance threshold level, then the base station determines to move the APD from a first location to a second location, from a first orientation to a second orientation, and so forth. Alternatively or additionally, the base station initiates phase-sweeping operation(s) to determine the efficacy of various surface configurations at the current position, such as by analyzing feedback based on a phase-sweeping operations as described with reference to FIG. 11 and/or FIG. 14.

In response to determining the position configuration, the base station 120 transmits the position configuration to the APD 180 at 1025 and the APD 180 receives the position configuration at 1030. In various implementations, the base station 120 communicates (and the APD 180 receives) the position configuration over an APD control channel (e.g., an APD slow-control channel, an APD fast-control channel).

At 1035, the base station directs the APD 180 to update a position using the positional configuration and, at 1040, the APD 180 receives the direction to update the position. For instance, the base station 120 directs the APD 180 to update the position by sending an indication over the APD control channel. While the diagram 1000 illustrates the base station 120 communicating the position configuration and the direction to update the position separately, alternative or additional implementations combine these interactions. In one aspect, the base station 120 implicitly directs the APD 180 to update the position by sending the positional configuration. In other words, the APD 180 implicitly receives the direction to update the position by receiving the position configuration. In another aspect, the base station 120 explicitly directs the APD 180 to update the position, either by setting a field or flag in the same message used to send the positional configuration, or by explicitly sending a separate indication, as illustrated at 1035.

In response to receiving the position configuration at 1030 and the direction to update the position at 1040, the APD 180 modifies the position at 1045 using the position configuration. For example, with reference to FIG. 3, the APD manager 316 communicates the position configuration to the motor controller 322 to move and/or adjust a position of the APD 180, such as by communicating with the motor controller 322 through a hardware interface (e.g., hardware addresses), an Application Program Interface (API) interface, or a local wireless link.

Sub-diagram 1050 generally denotes signaling and control transactions used to communicate and apply a position configuration to an APD. At times, this includes communicating and applying multiple position configurations to multiple APDs, respectively, such as that described with reference to FIG. 15.

As described with reference to FIG. 7, the base station 120 identifies a surface configuration for the APD at 740 and transmits an indication of the surface configuration to the APD 180 at 745. In aspects, the base station 120 analyzes the position configuration determined at 1015 and selects the surface configuration best suited for the position configuration (e.g., best improves signal quality relative to other surface configurations at a particular position configuration). Alternatively, or additionally, the base station 120 selects the surface configuration based on link quality parameters. At 750, the APD 180 receives the indication of the surface configuration and applies the surface configuration to the RIS of the APD 180 as further described.

In response to communicating the position configuration and/or surface configuration, and in response to the APD 180 applying the position configuration and/or surface configuration, the base station 120 and the UE 110 communicate using the APD 180 as described at 755 of FIG. 7. In aspects, this includes the APD 180 moving in a common direction as the UE 110 (e.g., moving with a velocity and/or rate based on an estimated UE-velocity).

Generally, sub-diagram 1055 denotes signaling and control transactions used to communicate and apply a surface configuration to an APD. At times, this includes communicating and applying multiple surface configurations to multiple APDs, respectively, such as that described with reference to FIG. 16.

The signaling and control transactions of the diagram 1000 can iteratively repeat, as indicated at 1060 with a line that optionally returns to the diagram 1000 at 720 and/or at 740. In other words, the base station may determine a new position configuration and/or a new surface configuration for the APD 180. To illustrate, consider an example in which the current operating environment continuously changes, such as by the UE 110 moving to a new location or an object moving into the transmission path. In evaluating these changes, such as through link quality parameters received from the UE 110 (e.g., CSI, RSPR, SINR) and/or generated by the base station 120 (e.g., at 720), the base station 120 determines a new position configuration of the APD 180 and/or a new surface configuration for an RIS of the APD. This provides the base station 120 with an ability to dynamically improve the system performance by moving the APD 180 to the new position configuration and/or applying a new surface configuration to the APD 180 as the UE 110 moves to improve communications at the UE 110 (e.g., improved data rates, data throughput, reliability signal quality).

A second example of signaling and control transactions for APD control is illustrated by the signaling and control transaction diagram 1100 of FIG. 11. The diagram 1100 provides example signaling and control transactions for performing sub-diagram 1020 of FIG. 10. While the diagram 1100 illustrates signaling and control transactions between a single APD and a single UE, alternative or additional implementations include multiple APDs and multiple UEs, such as that described with reference to FIG. 14.

To determine the efficacy of a current position of the APD (e.g., a physical position, location, and/or orientation of the APD), at 1105, the base station 120 selects a phase-sweeping pattern. In aspects, a phase-sweeping pattern corresponds to a predetermined series of surface configurations for the RIS at the APD 180, where the series of surface configurations collectively sweep the phase adjustment and/or transformation of signals that strike the RIS surface. As further described, this allows the base station 120 to transmit signal(s) towards the RIS of the APD 180 and receive feedback (e.g., link quality parameters) from the UE 110 on the received signals transformed by the RIS using the phase-sweeping pattern. The base station then analyzes the feedback to evaluate the efficacy of the APD 180 at a current position. Alternatively, or additionally, the base station selects a surface configuration for the RIS directed towards improving communications.

In some aspects, the base station 120 selects the phase-sweeping pattern using the link quality parameters obtained at 720 of FIGS. 7 and 10. To illustrate, assume the base station 120 includes a phase-sweeping-pattern codebook, where each phase-sweeping pattern entry in the codebook corresponds to unique link quality parameter(s) (e.g., a first phase-sweeping pattern corresponds to a first link quality parameter value, a second phase-sweeping pattern corresponds to a second link quality parameter value, a third phase-sweeping pattern corresponds to a third link quality parameter value). In response to obtaining the link quality parameters at 720, the base station 120 accesses the phase-sweeping codebook at 1105 using the obtained link quality parameter(s) to select a particular phase-sweeping pattern optimized for the current channel conditions. Alternatively, the base station 120 selects a default phase-sweeping pattern.

At 1110, the base station communicates the phase-sweeping pattern to the APD 180, and at 1115, the APD 180 receives an indication of the phase-sweeping pattern. As one example, the base station obtains an index of the phase-sweeping codebook that references the phase-sweeping pattern selected at 1105 and transmits an indication of the index to the APD 180, such as by communicating the index using an APD control channel.

At 1120, the base station directs the APD 180 to initiate the phase-sweeping pattern, and at 1125, the APD 180 initiates the phase-sweeping pattern in response to receiving the directions from the base station 120. For instance, the base station 120 directs the APD 180 to initiate the phase-sweeping pattern by sending an indication over the APD control channel.

While the diagram 1100 illustrates the base station 120 communicating the phase-sweeping pattern and the direction to initiate the phase-sweeping pattern separately, alternative or additional implementations combine these interactions. In one aspect, the base station 120 implicitly directs the APD 180 to initiate the phase-sweeping pattern by communicating the phase-sweeping pattern. In other words, the APD 180 implicitly receives the indication to initiate the phase sweeping by receiving the phase-sweeping pattern. Alternatively, or additionally, the base station 120 indicates a start time and/or a time duration in a same communication as the phase-sweeping pattern. In another aspect, the base station 120 explicitly directs the APD 180 to initiate the phase-sweeping pattern, either by setting a field or flag in the same message used to send the selection of the phase-sweeping pattern, or by explicitly sending a separate indication as illustrated at 1120.

In initiating the phase-sweeping pattern, the APD 180 sometimes adjusts the surface configuration of a corresponding RIS based on the indicated phase-sweeping pattern. For instance, the APD 180 accesses the phase-sweeping codebook using an index received at 1115. In some aspects, the phase-sweeping codebook directs the APD 180 to one or more entries in a surface-configuration codebook, start times on when to start applying the surface configuration(s), and/or switch times on when to modify a current surface configuration with a next-identified surface configuration in the phase-sweeping pattern.

At 1130, the base station 120 transmits one or more signal(s) towards the RIS of the APD 180, and at 1135, the APD 180 transforms the signal(s) using the phase-sweeping pattern communicated at 1110. As one example, the base station 120 transmits a signal towards the RIS of the APD 180, such as a sounding reference signal, and the APD 180 reconfigures the RIS using the phase-sweeping pattern. To illustrate, the APD 180 applies a first surface configuration to the RIS for a first time duration, a second surface configuration to the RIS for a second time duration, and so forth, such that the signal transforms according to the phase-sweeping pattern when striking the RIS.

At 1140, the UE 110 transmits one or more link quality parameters to the base station 120. In aspects, the UE 110 receives at least some of the transformed signals from the APD and generates link quality parameters on the transformed signals.

At 1145, the base station 120 analyzes the link quality parameters to determine the efficacy of a current position of the APD 180. For example, the base station determines whether the link quality parameters fall below an acceptable performance threshold and, if so, determines to move the APD.

Accordingly, in response to determining to move the APD, the base station 120 determines the position configuration based on the link quality parameters at 1150. For example, the base station 120 inputs the returned link quality parameters to a machine-learning algorithm to obtain the position configuration and/or accesses historical records to identify past position configurations used for similar link quality parameters as further described. Alternatively, or additionally, the base station 120 determines a new surface configuration for an RIS of the APD 180.

Position Control of Multiple APDs

Figure 12:
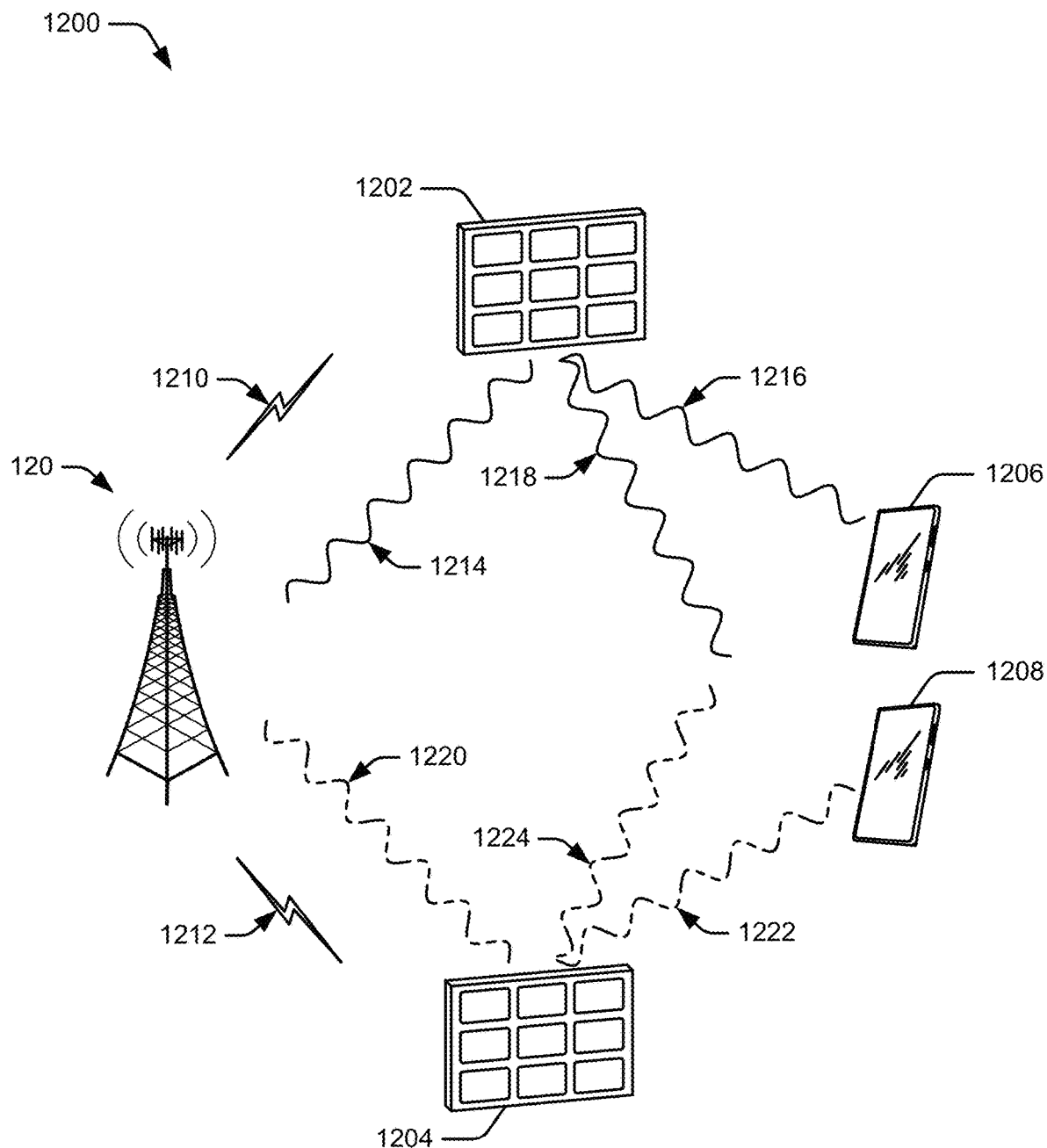
FIG. 12 illustrates an example environment in accordance with various implementations of position control of adaptive phase-changing devices.

FIG. 12 illustrates an example environment 1200 in which position control of APDs is implemented in accordance with various aspects. The environment 1200 includes the base station 120 of FIG. 1, multiple APDs, labeled as APD 1202 and APD 1204, and multiple UEs, labeled as UE 1206 and UE 1208. In aspects, the APDs 1202 and 1204 correspond to instances of the APD 180 of FIG. 1, and the UEs 1206 and 1208 correspond to instances of the UE 110 of FIG. 1. In aspects, the base station 120 configures the positions of the APD 1202 and the APD 1204 based on contemporaneous communications with the UE 1206 and the UE 1208. In the environment 1200, the base station 120 services multiple UEs (e.g., UE 1206 and UE 1208) using multiple APDs (e.g., APD 1202 and APD 1204), but in alternative implementations, the base station 120 services the multiple UEs utilizing a single APD, such as by configuring the surface of the APD on a slot-by-slot basis as described with reference to FIG. 5.

The base station 120 communicates with the APDs using separate APD control channels. Wireless link 1210, for example, corresponds to APD control channel(s) between the base station 120 and the APD 1202, while wireless link 1212 corresponds to APD control channel(s) between the base station and the APD 1202. The wireless links 1210 and 1212 each include respective APD slow-control channels and/or APD fast-control channels to enable communications between the base station 120 and the respective APDs. Thus, to configure the APD 1202, the base station 120 communicates using the wireless link 1210, and to configure the APD 1204, the base station communicates using the wireless link 1212.

The base station 120 also maintains contemporaneous communications with the UEs 1206 and 1208. To illustrate, the signal 1214 corresponds to a (first) downlink transmission from the base station 120 to the UE 1206. The signal 1214 propagates towards the APD 1202, impacts the RIS of the APD 1202, and transforms into signal ray 1216 and signal ray 1218, where the signal ray 1216 propagates towards the UE 1206 as part of the communications with the base station 120 and the signal ray 1218 propagates towards the UE 1208 and becomes interference in the UE 1208 communications. Similarly, the signal 1220 corresponds to a (second) downlink transmission from the base station 120 to the UE 1208. The signal 1220 impacts the RIS of the APD 1204 and transforms into signal ray 1222 and signal ray 1224. The signal ray 1222 propagates towards the UE 1208 as part of the communications with the base station 120, while the signal ray 1224 propagates towards the UE 1206 and becomes interference in the UE 1206 communications. In aspects of position control of APDs, the base station 120 configures a first position for a first APD (e.g., APD 1202) and a second position for a second APD (e.g., APD 1204) based on the contemporaneous communications with the UE 1206 and the UE 1208 and/or perceived interferences from other signals. In other words, the base station analyzes feedback from each UE based on various positions and/or various surface configurations for the APDs (which can include interference reflected from other APDs) and selects surface configurations and/or APD positions to improve communications for the multiple UEs.

FIGS. 13-16 illustrate example signaling and control transaction diagrams 1300, 1400, 1500, and 1600, respectively, between various network entities, such as the base station 120 of FIG. 1, the APDs 1202 and 1204 of FIG. 12, and the UEs 1206 and 1208 of FIG. 12. The base station 120, the APDs 1202 and 1204, and the UEs 1206 and 1208 may be implemented similar to the entities described with reference to FIGS. 1-12. In various aspects, the diagrams 1300, 1400, 1500, and 1600 operate in conjunction with diagram 700.

Figure 13:
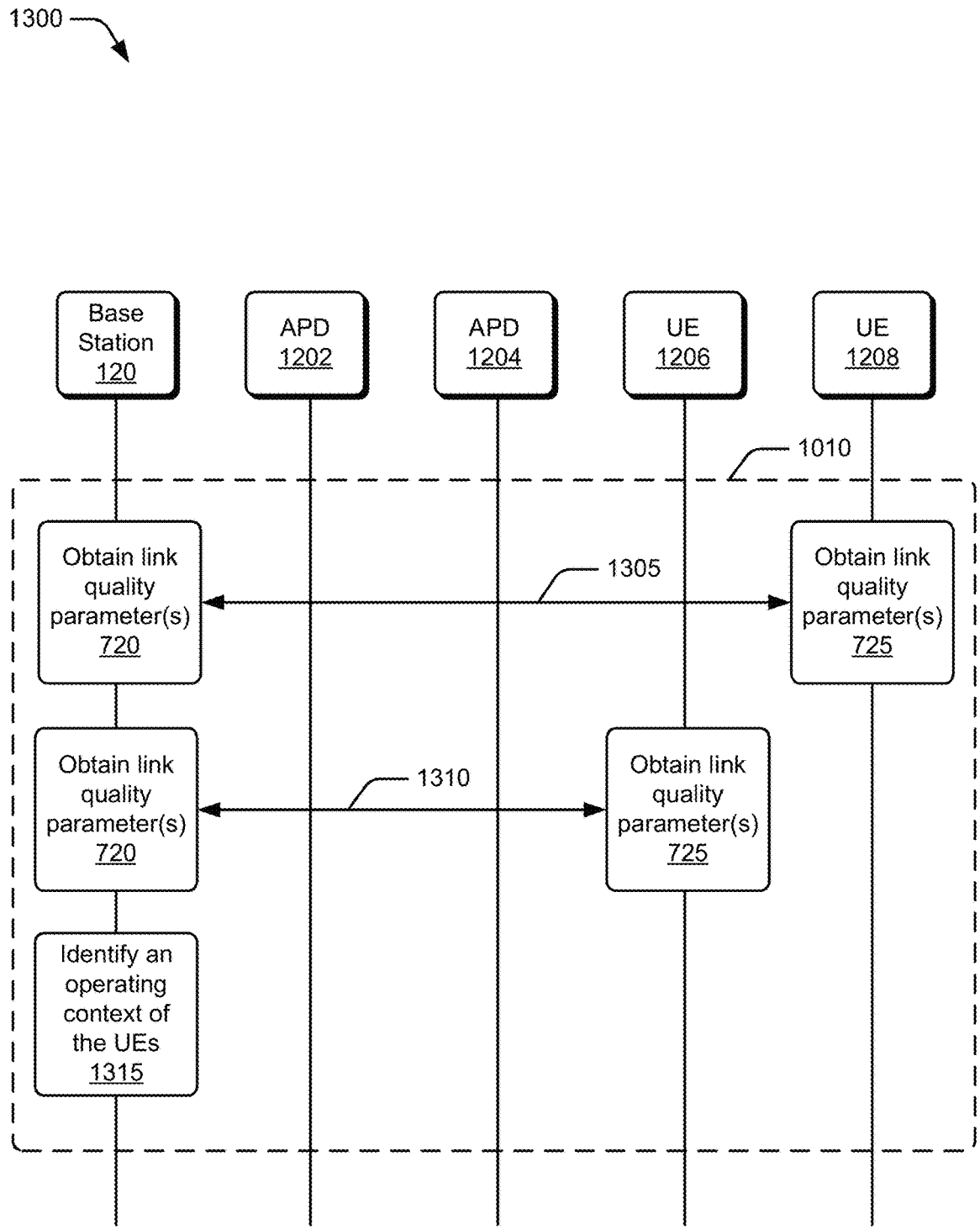
FIG. 13 illustrates a signaling and control transaction diagram between various network devices in accordance with one or more aspects of position control of adaptive phase-changing devices.

A third example of signaling and control transactions for APD control is illustrated by the signaling and control transaction diagram 1300 of FIG. 13. The diagram 1300 provides example signaling and control transactions for performing sub-diagram 1010 of FIG. 10 using multiple APDs and/or multiple UEs.

At 1305, the base station 120 and the UE 1208 obtain link quality parameters. For example, as described with reference to FIG. 7, the base station 120 obtains link quality parameters at 720 and the UE 1208 obtains link quality parameters at 725. As one example, the UE 1208 generates the link quality parameters based on the signal ray 1222 and/or the signal ray 1218, where the signal ray 1218 acts as interference. Similarly, at 1310, the base station 120 obtains link quality parameters at 720 and the UE 1206 obtains link quality parameters at 725. However, at 1310, the UE 1206 generates the link quality parameters based on the signal ray 1216, and the signal ray 1224, where the signal ray 1224 acts as interference.

At 1315, the base station 120 identifies one or more characteristics of the UEs. To illustrate, and similar to that described at 1015 of FIG. 10, the base station identifies a respective estimated UE-location and/or a respective estimated UE-velocity for the UE 1206 and/or UE 1208. In some aspects, and as further described with reference to FIG. 14, the base station 120 uses the link quality parameters from each UE to determine position configurations for each APD. As one example, the base station 120 determines a moving position configuration for a first APD, such as a moving position follows a movement of a UE (e.g., a position configuration that includes lateral and/or rotational adjustment that follow or track a moving location of the UE). Alternatively or additionally, the base station 120 determines fixed position configurations for other APDs, such as relative fixed position configurations that arrange the other APDs at a fixed position relative to the (moving) first APD or static, fixed positions such that the other APDs remain at a static location and/or rotation and do not follow or track the (moving) first APD.

Figure 14:
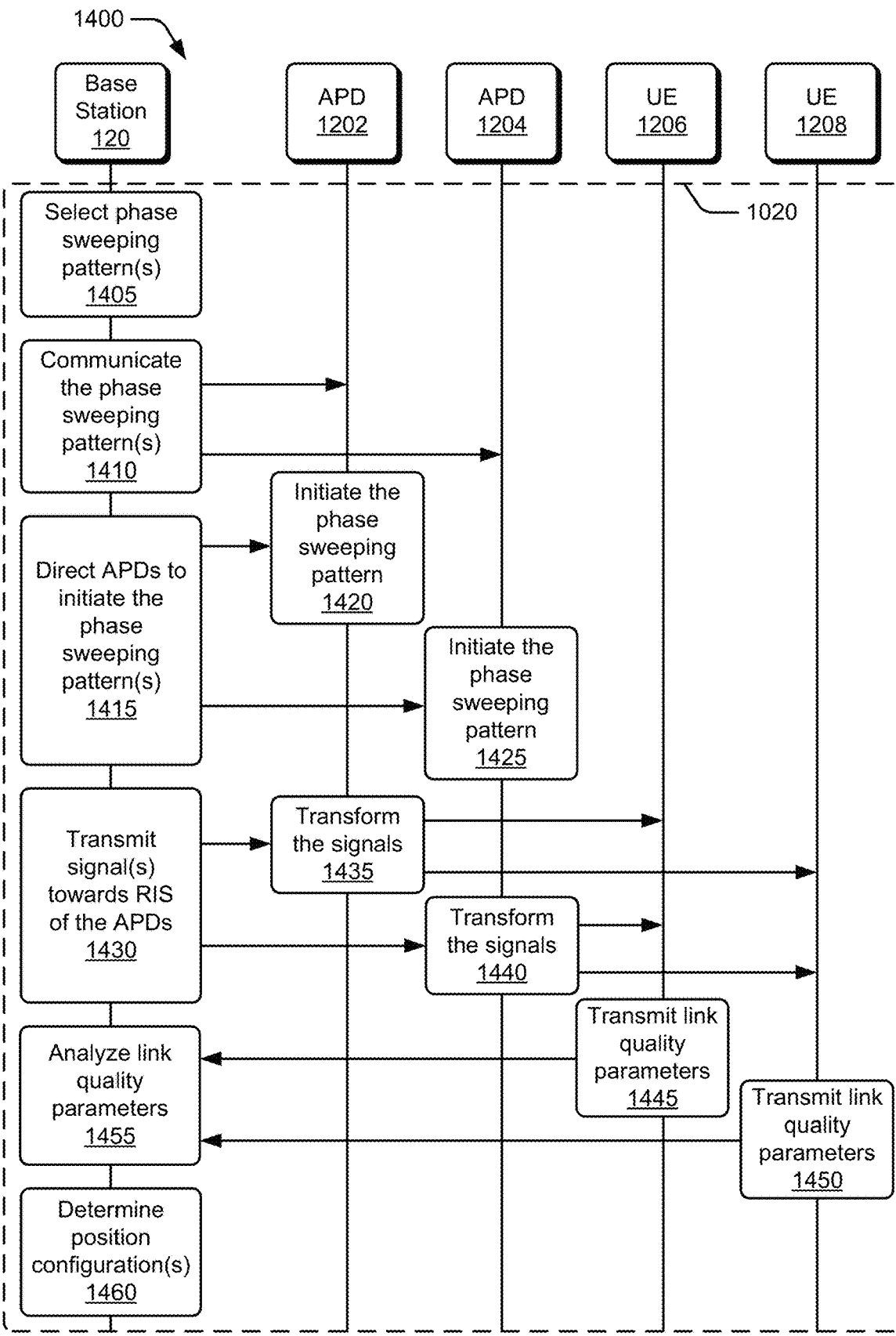
FIG. 14 illustrates a signaling and control transaction diagram between various network devices in accordance with one or more aspects of position control of adaptive phase-changing devices.

A fourth example of signaling and control transactions for APD control is illustrated by the signaling and control transaction diagram 1400 of FIG. 14. The diagram 1400 provides example signaling and control transactions for performing sub-diagram 1020 of FIG. 11 for determining a position configuration by evaluating the efficacy of current positions of multiple APDs and/or multiple UEs.

At 1405, the base station 120 selects one or more phase-sweeping pattern(s), such as by selecting the phase-sweeping pattern(s) using the link quality parameters obtained as described by diagram 1300 of FIG. 13. In some aspects, the base station 120 selects a common phase-sweeping pattern for each APD, while in other aspects, the base station 120 selects different phase-sweeping patterns for each of the APDs. To illustrate, the base station 120 accesses a phase-sweeping codebook using the obtained link quality parameter(s) to select a particular phase-sweeping pattern optimized for the channel conditions identified by the link quality parameters, such as using a first link quality parameter obtained from a first UE to select a first phase-sweeping pattern and using a second link quality parameter obtained from a second UE to select a second phase-sweeping pattern. Alternatively, the base station 120 selects a default phase-sweeping pattern for each APD.

At 1410, the base station 120 communicates the phase-sweeping pattern(s) to the APD 1202 and the APD 1204, such as that described at 1110 and 1115 of FIG. 11. To communicate the phase-sweeping patterns, the base station uses different APD control channels. For instance, the base station 120 uses the wireless link 1210 of FIG. 12 to communicate a phase-sweeping pattern to the APD 1202 and the wireless link 1212 of FIG. 12 to communicate a (common or different) phase-sweeping pattern to the APD 1204. In aspects, the base station communicates an index to each APD that maps to a particular phase-sweeping pattern in a phase-sweeping-pattern codebook.

At 1415, the base station 120 directs the APD 1202 and the APD 1204 to initiate the phase-sweeping patterns. For instance, as described at 1120 of FIG. 11, the base station 120 explicitly sends an indication and/or implicitly sends the indication to initiate the phase-sweeping pattern at each APD. In response to receiving the indication to initiate the phase-sweeping patterns, the APD 1202 and the APD 1204 initiate the phase-sweeping pattern at 1420 and at 1425. To illustrate, each APD adjusts the surface configuration for a respective RIS using the phase-sweeping pattern as further described.

At 1430, the base station 120 transmits one or more signal(s) to the APD 1202 and the APD 1204. In some aspects, the base station 120 transmits different beamformed signals towards each of the APDs, while in other aspects, the base station 120 transmits a single (common) beamformed signal that propagates towards each APD. At 1435 and at 1440, the APD 1202 and the APD 1204 transform the signals using the RIS and one or more surface configurations according to the phase-sweeping pattern. At 1445 and at 1450, the UE 1206 and the UE 1208 transmit link quality parameters to the base station 120, such as that described at 1140 of FIG. 11.

At 1455, the base station 120 analyzes the link quality parameters to determine the efficacy of the current APD positions. To illustrate, the base station 120 analyzes the link quality parameters to determine whether the link quality parameters all fall below an acceptable performance threshold. In some aspects, the base station 120 determines, at 1455, whether to move one or more of the APDs.

At 1460, and in response to determining to move one or more of the APDs, the base station determines the position configuration(s) for the APD 1202 and/or the APD 1204. For instance, the base station 120 processes the link quality parameters using a machine-learning algorithm to select the position configurations. In some aspects, the base station selects a moving position configuration as a first position configuration for a first APD (e.g., APD 1202) and a fixed position configuration as a second position configuration for a second APD (e.g., APD 1204). To illustrate, the base station 120 selects a moving position configuration that moves the APD 1202 towards the UE 1206 and the UE 1208 at a constant velocity. The base station 120 also selects a fixed position configuration that places the APD 1204 at a fixed location and/or a fixed rotational orientation.

By coordinating the phase-sweeping patterns between the APDs and analyzing link quality parameters from the multiple UEs, the base station 120 selects optimal positions (e.g., positions that mitigate channel impairments better relative to other positions) for each of the APDs to improve communications at the multiple UEs. To illustrate, the link quality parameters generated by the UE 1206 include interference from communications directed to the UE 1208, and vice versa. Thus, the coordinated phase-sweeping patterns generate link quality parameters that include how the orientation and/or location of each APD affects the received signals at the UEs.

Figure 15:
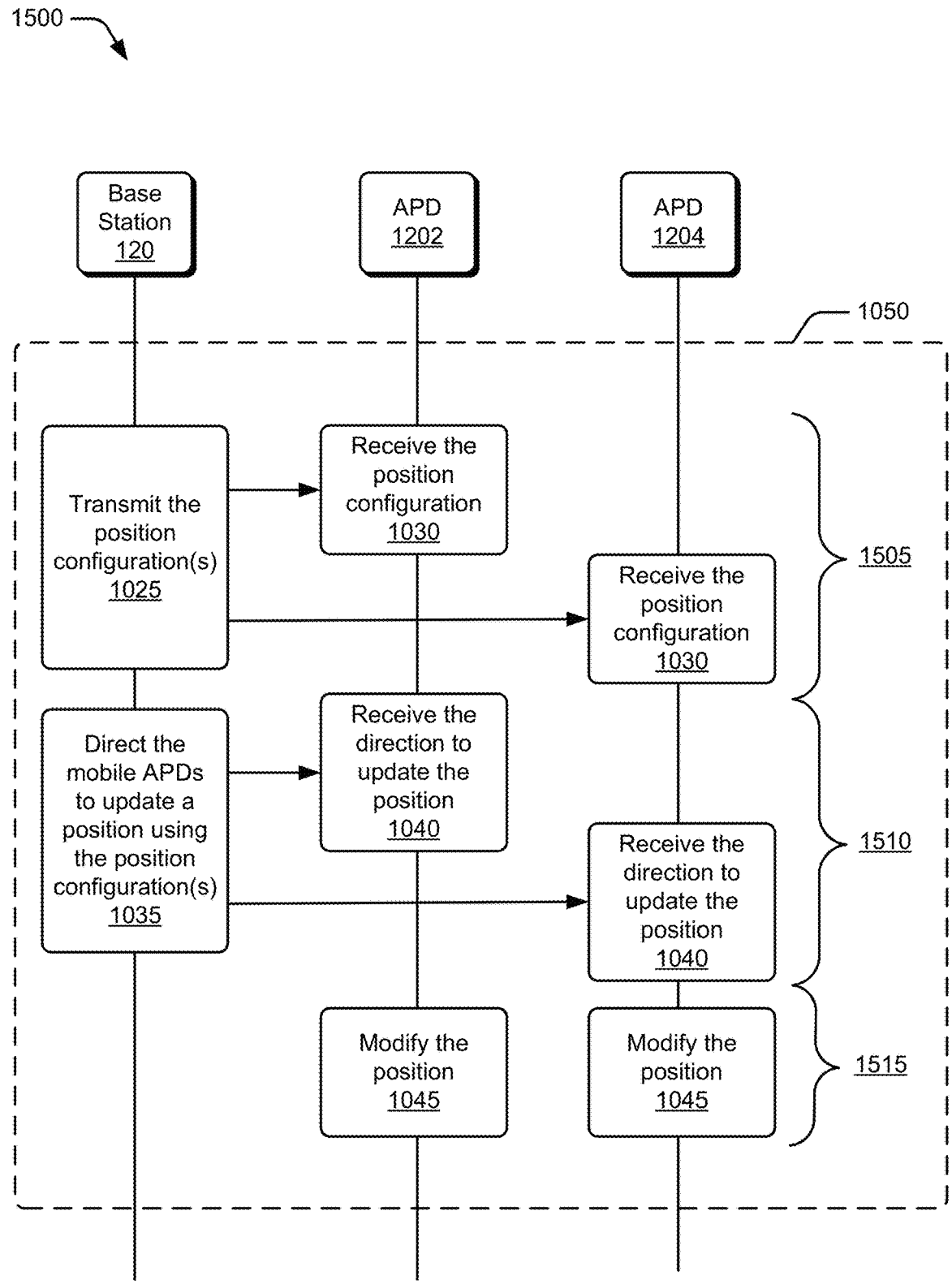
FIG. 15 illustrates a signaling and control transaction diagram between various network devices in accordance with one or more aspects of position control of adaptive phase-changing devices.

A fifth example of signaling and control transactions for APD control is illustrated by the signaling and control transaction diagram 1500 of FIG. 15. The diagram 1500 provides example signaling and control transactions for performing sub-diagram 1050 of FIG. 10 using multiple APDs and/or multiple UEs.

At 1505, the base station communicates the determined position configurations (e.g., determined using any variation of sub-diagram 1020) to the APD 1202 and the APD 1204. To illustrate, at 1025, the base station transmits a first position configuration to the APD 1202 and a second position configuration to the APD 1204, such as by using respective APD control channels. Similarly, at 1030, the APD 1202 receives the first position configuration and the APD 1204 receives the second configuration. The base station 120 communicates any combination of fixed position configurations and mobile position configurations to the APDs.

At 1510, the base station directs each of the APDs to update a (respective) position using the position configurations. For instance, at 1035, the base station directs the APDs using explicit or implicit indications over the respective APD control channels as further described. Similarly, at 1040 the APD 1202 and the APD 1204 each (respectively) receive the direction to update the position configuration.

At 1515, the APD 1202 and the APD 1204 modify the respective positions. To illustrate, at 1045, the APD 1202 and the APD 1204 each update a position by applying any combination of rotational and/or linear adjustments as indicated by the corresponding position configuration. As further described, this can include a first APD applying a moving position configuration and a second APD (or more) applying a fixed position configuration.

Figure 16:
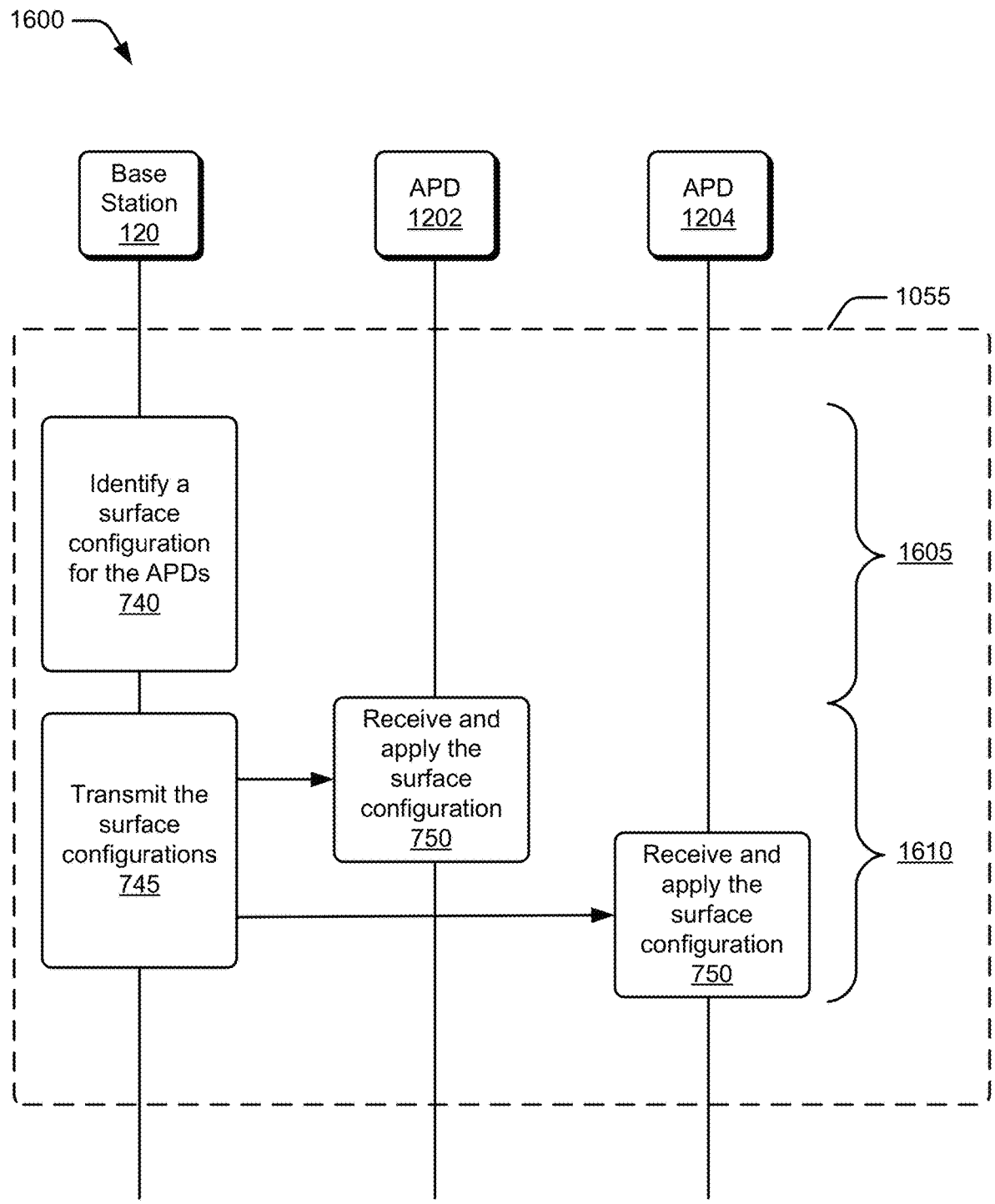
FIG. 16 illustrates a signaling and control transaction diagram between various network devices in accordance with one or more aspects of position control of adaptive phase-changing devices.

A sixth example of signaling and control transactions for APD control is illustrated by the signaling and control transaction diagram 1600 of FIG. 16. The diagram 1600 provides example signaling and control transactions for performing sub-diagram 1055 of FIG. 10 using multiple APDs and/or multiple UEs.

At 1605, the base station identifies surface configurations for the APDs 1202 and 1204. To illustrate, at 740, the base station identifies a first surface configuration for an RIS of the APD 1202 and a second surface configuration for the RIS of the APD 1204, such as by analyzing link quality parameters obtained at 720 and/or at 725 of FIGS. 7 and 10.

At 1610, the base station transmits an indication of a surface configuration to each of the APDs, and the APDs receive and apply the surface configurations. For instance, at 745, the base station transmits a first surface configuration to the APD 1202 using a first APD control channel (e.g., wireless link 1210) and a second surface configuration to the APD 1204 using a second APD control channel (e.g., wireless link 1212). Similarly, at 750, the APD 1202 and the APD 1204 each (respectively) receive the surface configuration and apply the surface configuration to a corresponding RIS.

Positional adjustments to an APD, such as rotational and/or linear adjustments, provide a base station with an ability to dynamically improve the system performance. For instance, in response to determining that channel conditions have deteriorated based on a UE moving locations, the base station determines a new position configuration for an APD, where the new position configuration mitigates problems identified through an analysis of link quality parameters. Thus, the ability to physically adjust an orientation, location, and even velocity, of an APD helps improve communications at a UE (e.g., improved data rates, data throughput, reliability signal quality).

Methods for Position Control of APDs

Example methods 1700 and 1800 are described with reference to FIGS. 17 and 18 in accordance with one or more aspects of position control of adaptive phase-changing devices. The order in which the method blocks are described is not intended to be construed as a limitation, and any number of the described method blocks can be skipped or combined in any order to implement a method or an alternative method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 17:
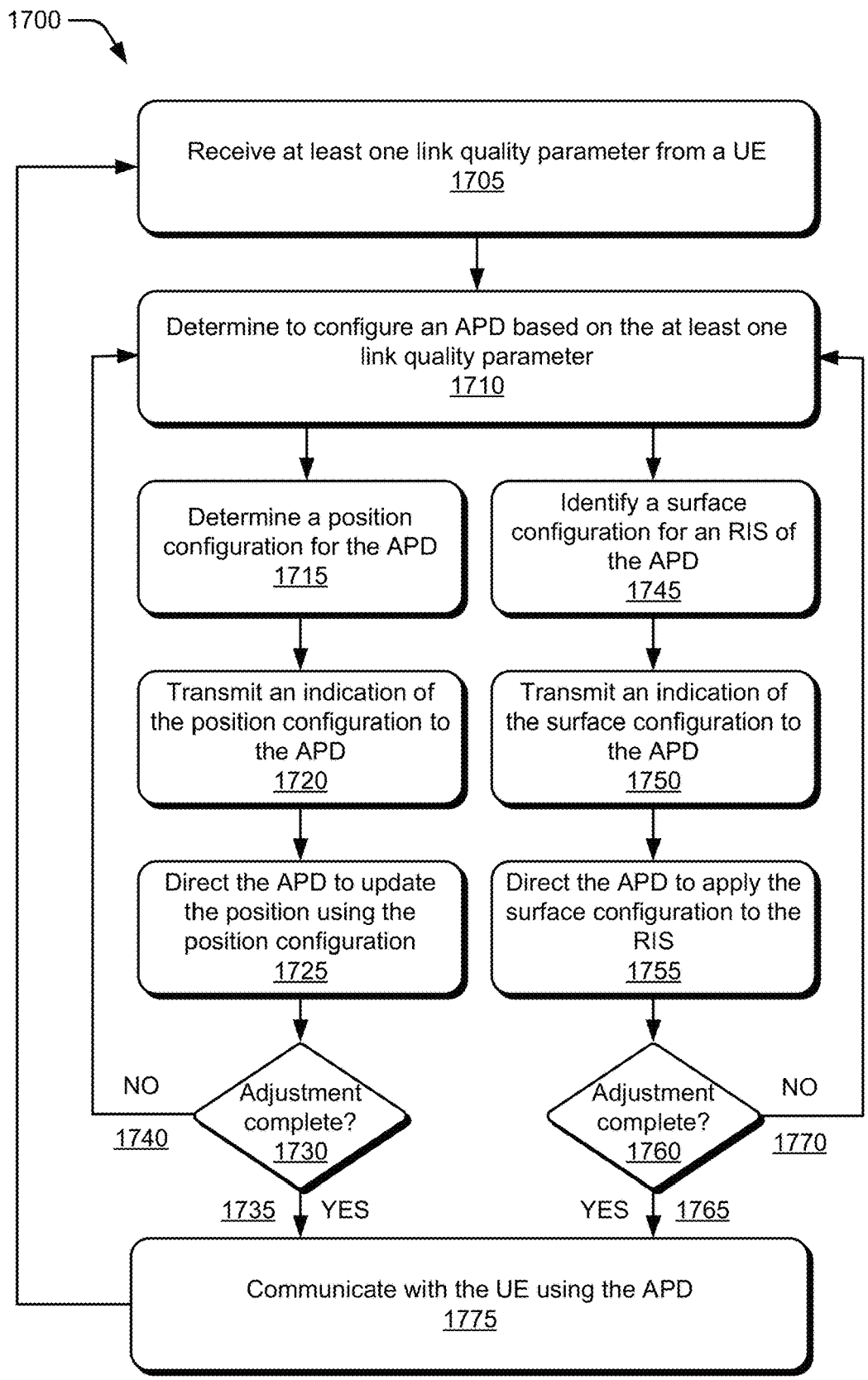
FIG. 17 illustrates an example method for position control of adaptive phase-changing devices in accordance with one or more aspects.

FIG. 17 illustrates an example method 1700 for position control of adaptive phase-changing devices. In some implementations, operations of method 1700 are performed by a base station, such as base station 120, as illustrated in FIGS. 1-16.

At 1705, the base station receives at least one link quality parameter from a UE. For instance, the base station (e.g., base station 120) receives at least one link parameter from the UE (e.g., UE 110, UE 1206, UE 1208), as described at 720. The base station receives any combination and number of link quality parameters, such as CSI, RSRP, RSSI, SINR, and so forth. Depending on circumstances, the link quality parameter may relate to a line-of-sight wireless link 132 between the UE 110 and the base station 120, or may relate to a non-line-of-sight wireless link 131 between the UE 110 and the base station 120 that uses the APD 180.

At 1710, the base station determines to configure an APD based on the at least one quality parameter. For example, the base station (e.g., base station 120) determines to configure the APD (e.g., APD 180, APD 1202, APD 1204) based on the at least one quality parameter indicating a channel impairment as described at 1105 and at 735. In some aspects, the base station determines to configure a surface configuration of an RIS (e.g., RIS 318) of the APD. Alternatively, or additionally, the base station determines to configure a position of the APD. Thus, the base station can determine to configure a surface configuration of the APD, a position of the APD, or both a surface configuration and a position of the APD. As further described, the base station sometimes iteratively adjusts the surface configuration and/or position.

At 1715, the base station determines a position configuration for the APD. To illustrate, the base station (e.g., base station 120) determines a position configuration for the APD (e.g., APD 180, APD 1202, APD 1204) as described at 1015. In some aspects, the base station determines a fixed position configuration, while in other aspects, the base station determines a mobile position configuration. This includes the base station determining a single position configuration for a single APD (e.g., the APD 180) or the base station determining multiple position configurations for multiple APDs (e.g., APD 1202, APD 1204). For example, when the APD is a first APD in multiple APDs, the base station determines a moving position configuration for the first APD and determines, for each APD of the multiple APDs except the first APD, a fixed position configuration.

To determine the position configurations, the base station sometimes uses a trained machine-learning algorithm, such as a DNN, by inputting the one or more link quality parameters to the machine-learning algorithm, and obtaining the position configuration from the machine-learning algorithm. Alternatively or additionally, the base station uses a phase-sweeping operation, such as by initiating a phase-sweeping operation at one or more APDs, receiving one or more link quality parameters from one or more UEs that measure a performance of the phase-sweeping operation at the APD(s). The base station then determines the position configurations(s) by analyzing the link quality metrics, such as through the machine-learning algorithm. At times, the base station selects a phase-sweeping pattern to use for the phase-sweeping operation and communicates the phase-sweeping pattern to the APD, such as over an APD control channel. This can include selecting multiple phase-sweeping patterns and/or communicating the phase-sweeping pattern(s) to multiple APDs.

At 1720, the base station transmits an indication of the position configuration to the APD. To illustrate, the base station (e.g., base station 120) transmits an indication of the position configuration to the APD (e.g., APD 180, APD 1202, APD 1204) as described at 1025 of FIG. 10. At 1725, the base station directs the APD to update a position of the APD using the position configuration. For example, the base station (e.g., base station 120) directs the APD (e.g., APD 180, APD 1202, APD 1204) to update the position using the position configuration as described at 1035 of FIG. 10. The base station can implicitly or explicitly indicate the direction to update the position as further described.

At 1730, the base station determines whether adjustments to the APD are completed. For example, the base station (e.g., base station 120) determines whether to perform additional position adjustments and/or whether to perform a surface configuration adjustment. If the base station determines that the adjustments are complete, at 1735, the method advances to 1775, and the base station communicates with the UE using the APD as further described. However, if the base station determines that the adjustments are not complete, at 1740, the method returns to 1710. In response to returning to 1710, the base station repeats the process as described at 1715, at 1720, and at 1725 to adjust the position of the APD. Alternatively, or additionally, the base station configures an RIS of the APD as further described at 1745, 1750, and 1755.

At 1745, the base station identifies a surface configuration for the APD. For example, the base station (e.g., base station 120) identifies a surface configuration for the APD (e.g., APD 180, APD 1202, APD 1204) that configures an RIS of the APD as described at 740.

At 1750, the base station transmits an indication of the surface configuration to the APD. To illustrate, as described at 745 and at 1055, the base station (e.g., base station 120) transmits the surface configuration to the APD (e.g., APD 180, APD 1202, APD 1204) over one or more APD control channels (e.g., wireless link 133, wireless link 1210, wireless link 1212).

At 1755, the base station directs the APD to apply the surface configuration to the RIS. For example, the base station (e.g., the base station 120) directs the APD (e.g., APD 180, APD 1202, APD 1204) to update the RIS using the surface configuration, such as by indicating the direction over the APD control channel. The base station can implicitly or explicitly indicate the direction to update the surface as further described.

At 1760, the base station determines whether adjustments to the APD are completed. For example, the base station (e.g., base station 120) determines whether to perform additional surface configuration adjustments and/or to perform position adjustments. If the base station determines that the adjustments are complete, at 1765, the method advances to 1775, and the base station communicates with the UE using the APD as further described. However, if the base station determines that the adjustments are not complete, at 1770, the method returns to 1710. In response to returning to 1710, the base station repeats the process as described at 1745, at 1750, and at 1755 to adjust the surface configuration of the APD. Alternatively, or additionally, the base station configures (and/or reconfigures) the position of the APD as further described at 1715, 1720, and 1725.

At 1775, the base station communicates with the UE using the APD. For example, the base station (e.g., the base station 120) communicates with the UE (e.g., the UE 110) using the APD (e.g., APD 180, APD 1202, APD 1204) as described at 755. The base station communicates with the UE using the APD by transmitting a downlink wireless signal towards the surface of the APD. Alternatively, or additionally, the base station communicates with the UE using the APD by receiving an uplink wireless signal from the surface of the APD.

Figure 18:
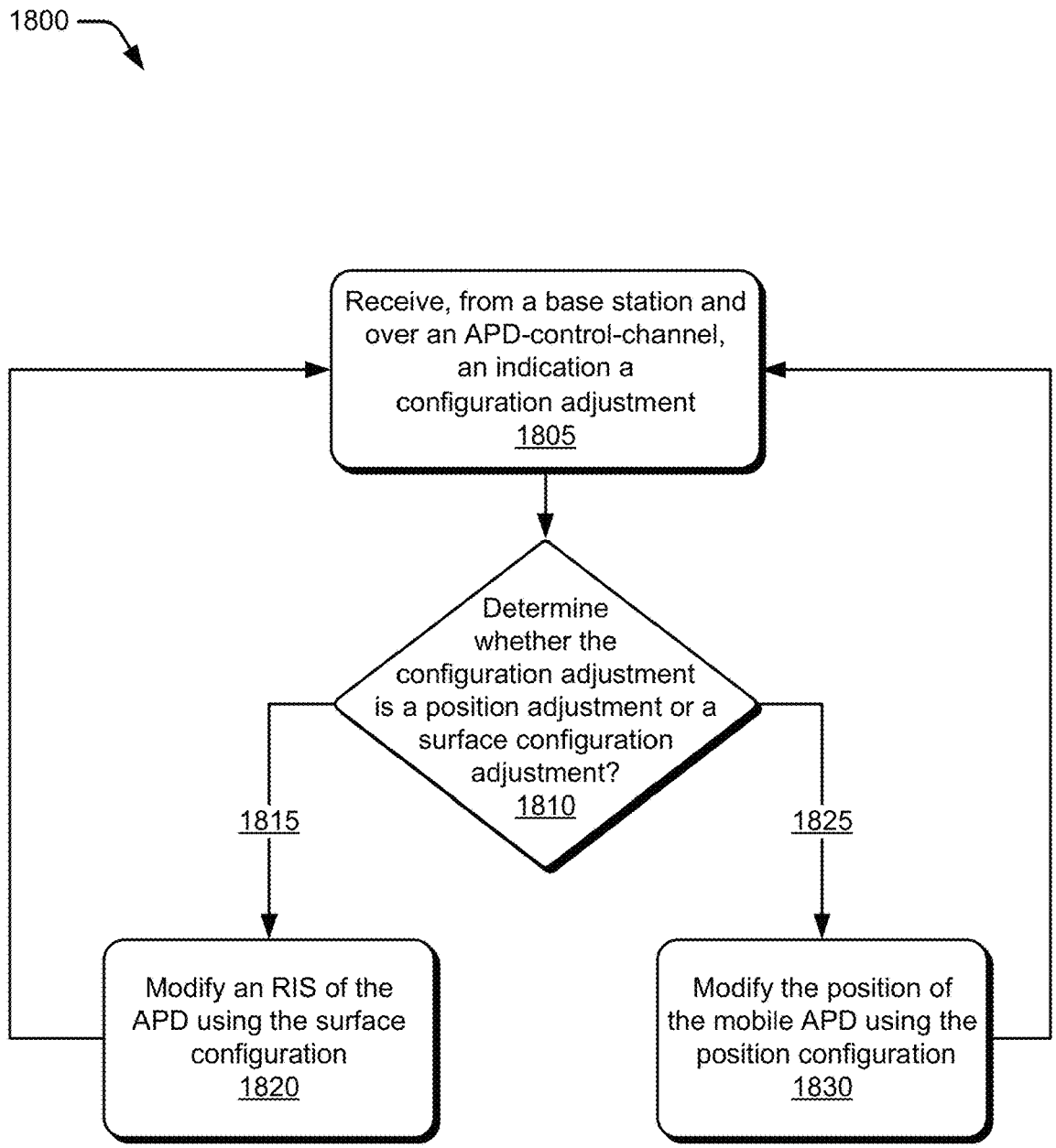
FIG. 18 illustrates an example method for position control of adaptive phase-changing devices in accordance with one or more aspects.

FIG. 18 illustrates an example method 1800 for position control of adaptive phase-changing devices. In some implementations, operations of method 1800 are performed by an APD, such as any of APDs 180, 1202, and 1204.

At 1805, an APD receives, from a base station and over an APD control channel, an indication of a configuration adjustment. For example, the APD (e.g., APD 180, APD 1202, APD 1204) receives the indication from the base station (e.g., base station 120) over an APD slow-control channel or an APD fast-control channel (e.g., wireless link 133, wireless link 1210, wireless link 1212). In some aspects, the APD receives the configuration adjustment as an indication of a surface configuration, such as that described at 750 of FIG. 7. Alternatively, or additionally, the APD receives the configuration adjustment as an indication of a position configuration, such as that described at 1030 of FIG. 10.

At 1810, the APD determines whether the configuration adjustment is a position adjustment or a surface configuration adjustment. For example, the APD (e.g., APD 180, APD 1202, APD 1204) determines whether the received indication specifies a surface configuration (e.g., an index value into a surface configuration codebook) or a position configuration (e.g., a first rotation around a first axis that defines a spatial area, a second rotation around a second axis that defines the spatial area, a third rotation around a third axis that defines the spatial area, a velocity of the first rotation, the second rotation, the third rotation, or the linear adjustment). In response to determining the received indication specifies a surface configuration, at 1815, the method proceeds to 1820. Alternatively, in response to determining the received indication specifies a position configuration, at 1825, the method proceeds to 1830.

At 1820, the APD modifies a reconfigurable intelligent surface (RIS) of the APD using the surface configuration. For example, as described at 750 of FIG. 7, the APD (e.g., APD 180, APD 1202, APD 1204) modifies the RIS of the APD by using the index to access a surface-configuration codebook (e.g., surface-configuration codebook 510) to retrieve a phase vector. The method then returns to 1805, where the APD receives (at an arbitrary point in time later) one or more additional indications that specify additional surface configuration adjustments and/or position configuration adjustments.

At 1830, the APD modifies the position of the APD using the position configuration. For example, the APD (e.g., APD 180, APD 1202, APD 1204) modifies the position by communicating with a motor controller (e.g., motor controller 322) through any one of a local wireless link, a hardwire link, and/or an API. The method then returns to 1805, where the APD receives (at an arbitrary point in time later) one or more additional indications that specify additional position configuration adjustments and/or surface configuration adjustments. Thus, the APD receives any combination and number of surface configuration adjustments and/or position configuration adjustments and modifies the APD accordingly.

Although aspects of position control of APDs have been described in language specific to features and/or methods, the subject of the appended claims is not necessarily limited to the specific features or methods described. Rather, the specific features and methods are disclosed as example implementations of position control of adaptive phase-changing devices, and other equivalent features and methods are intended to be within the scope of the appended claims. Further, various aspects are described, and it is to be appreciated that each described aspect can be implemented independently or in connection with one or more other described aspects.

In the following, several examples are described:

Example 1: A method performed by a base station for configuring an adaptive phase-changing device, APD, the method comprising: receiving from a user equipment, UE, at least one link quality parameter that is indicative of a channel impairment; identifying, using the at least one link quality parameter, a surface configuration for a reconfigurable intelligent surface, RIS, of the APD that mitigates the channel impairment by transforming characteristics of a wireless signal propagated between the base station and the UE; transmitting, to the APD, a first indication that indicates the identified surface configuration using an adaptive phase-changing device control channel, APD control channel; and communicating with the UE using the APD by: transmitting, a downlink wireless signal for the UE towards the RIS of the APD; or receiving an uplink wireless signal from the UE, the uplink wireless signal being transformed by the RIS of the APD.

Example 2: The method as recited in example 1, further comprising: determining, using the at least one link quality parameter, a position configuration for the APD to mitigate the channel impairment by changing a position of the APD; and transmitting a second indication that indicates the determined position configuration to the APD.

Example 3: The method as recited in example 2, wherein determining the position configuration for the APD further comprises: determining one or more of: a first rotation around a first axis that defines a spatial region; a second rotation around a second axis that defines the spatial region; a third rotation around a third axis that defines the spatial region; a linear adjustment along at least one of the first axis, second axis, or third axis; or a velocity of the first rotation, the second rotation, the third rotation, or the linear adjustment.

Example 4: The method as recited in example 2 or example 3, wherein determining the position configuration further comprises: initiating a phase-sweeping operation at the APD; receiving one or more link quality parameters from the UE that measure a performance of the phase-sweeping operation at the APD; and selecting the position configuration using the one or more link quality parameters that measure the performance of the phase-sweeping operation.

Example 5: The method as recited in example 4, wherein initiating the phase-sweeping operation further comprises: selecting a phase-sweeping pattern from a phase-sweeping-pattern codebook; and communicating the phase-sweeping pattern to the APD by indicating an index of the phase-sweeping codebook that corresponds to the selected phase-sweeping pattern.

Example 6: The method as recited in any one of examples 2 to 5, wherein communicating the position configuration comprises: transmitting, to the APD, the position configuration using the APD control channel.

Example 7: The method as recited in any one of examples 2 to 6, wherein the APD is a first APD of multiple APDs, and wherein determining the position configuration for the APD further comprises: determining a moving position configuration for the first APD; and determining, for a second APD of the multiple APDs, a fixed position configuration.

Example 8: The method as recited in example 7, wherein determining the fixed position configuration further comprises: initiating, at the second APD, a phase-sweeping operation over a respective APD control channel for the second APD.

Example 9: The method as recited in any one of examples 2 to 8, wherein determining the position configuration further comprises: inputting the one or more link quality parameters to a machine-learning algorithm; and obtaining the position configuration from the machine-learning algorithm.

Example 10: The method as recited in any one of examples 2 to 9, further comprising after the communicating with the UE using the APD: receiving from the UE at least a second link quality parameter that is indicative of a second channel impairment; and updating the APD with at least one of a second position configuration or a second surface configuration based on the at least second link quality parameter to mitigate the second channel impairment.

Example 11. The method as recited in any one of the preceding examples, further comprising: identifying at least an estimated UE-location or an estimated UE-velocity; and selecting the APD based on the estimated UE-location or the estimated UE-velocity.

Example 12: The method as recited in any one of the preceding examples, wherein transmitting the first indication comprises: transmitting the first indication using signaling on an APD fast-control channel; or transmitting, using an APD slow-control channel, the first indication in a control message.

Example 13: The method as recited in any one of the preceding examples, wherein communicating with the UE further comprises: communicating with the UE in a first operating frequency band, and wherein transmitting the first indication comprises: communicating with the APD using an APD control channel in a second operating frequency band that is different from the first operating frequency band.

Example 14: The method as recited in any one of the preceding examples, wherein identifying the surface configuration comprises: identifying a phase vector from a surface-configuration codebook based on the at least one link parameter, and wherein transmitting the first indication of the surface configuration further comprises: transmitting, to the APD, a codebook index that maps to the phase vector.

Example 15: The method as recited in example 14, further comprising: transmitting the surface-configuration codebook to the APD.

Example 16: The method as recited in example 15, wherein transmitting the surface-configuration codebook further comprising: transmitting the surface-configuration codebook to the APD using an APD slow-control channel; transmitting the surface-configuration codebook to the APD using a wired interface; or directing the APD to obtain the codebook from another network element.

Example 17: The method as recited in any one of examples 1 to 13, wherein identifying the surface configuration comprises: determining a beam configuration for transforming the wireless signal, and wherein transmitting the first indication of the surface configuration further comprises: transmitting a third indication of the beam configuration by transmitting an index of a beam-codebook.

Example 18: The method as recited in any one of the preceding examples, further comprising: determining timing information that includes a start time to apply the surface configuration; and transmitting a fourth indication of the timing information to the APD using the APD control channel.

Example 19: The method as recited in example 18, wherein determining the timing information further comprises: determining a stop time to stop using the surface configuration; and transmitting a fifth indication of the stop time to the APD.

Example 20. The method as recited in any one of the preceding examples, wherein identifying the surface configuration further comprises: identifying the surface configuration to modify: one or more phase characteristics of the wireless signal propagated between the base station and the UE; one or more amplitude characteristics of the wireless signal between the base station and the UE; or both the one or more phase characteristics and the one or more amplitude characteristics.

Example 21: The method as recited in any one of the preceding examples, wherein receiving the at least one link quality parameter comprises: receiving at least one of: a signal-to-interference-plus-noise ratio, SINR; a reference signal receive power, RSRP; or channel state information, CSI.

Example 22: A method performed by an adaptive phase-changing device, APD, for configuring a Reconfigurable Intelligent Surface, RIS, and position of the APD, the method comprising: receiving, from a base station and over an APD control channel, a first indication of a surface configuration for the RIS; modifying the RIS surface configuration based on the first indication; receiving, from the base station and over the APD control channel, a second indication of a position configuration; and modifying the position of the APD based on the second indication.

Example 23: The method as recited in example 22, wherein receiving the first indication further comprises: receiving, from the base station, an index to a surface-configuration codebook, and wherein the method further comprises: retrieving the surface configuration from the surface-configuration codebook using the index.

Example 24: The method as recited in example 23, further comprising: receiving the surface-configuration codebook, from the base station by: receiving the surface-configuration codebook using the APD control channel; receiving the surface-configuration codebook using a wired interface; or receiving the surface-configuration codebook from another network entity in response to receiving a third indication from the base station that directs the APD to obtain the codebook from another network entity.

Example 25: The method as recited in any one of examples 22 to 24, wherein receiving the first indication or receiving the second indication further comprises: receiving, using an APD slow-control channel, the first indication or the second indication in a control message; or receiving the first indication or the second indication using signaling over an APD fast-control channel.

Example 26: The method as recited in any one of examples 22 to 25, wherein receiving the first indication of the surface configuration further comprises: receiving an indication of a phase vector; or receiving an indication of a beam direction.

Example 27: The method as recited in any one of examples 22 to 26, wherein receiving the first indication of the surface configuration further comprises: receiving timing information, and wherein modifying the RIS further comprises: modifying the RIS based on the timing information.

Example 28: The method as recited in example 27, wherein modifying the RIS further comprises: modifying the RIS based on at least one of: a start time included in the timing information that indicates when to begin applying the surface configuration to the APD; or a stop time included in the timing information that indicates when to stop applying the surface configuration to the APD.

Example 29: The method as recited in any one of examples 22 to 28, the method further comprising: transforming, using the modified RIS, an incident wireless signal into a transformed wireless signal that is directed to a user equipment, UE.

Example 30: The method as recited in any one of examples 22 to 29, wherein receiving the second indication of the position configuration indicates one or more of: a first rotation around a first axis that defines a spatial region; a second rotation around a second axis that defines the spatial region; a third rotation around a third axis that defines the spatial region; a linear adjustment along at least one of the first axis, second axis, or third axis; or a velocity of the first rotation, the second rotation, the third rotation, or the linear adjustment.

Example 31: The method as recited in any one of examples 22 to 30, further comprising: receiving, from the base station, a command to initiate a phase-sweeping operation; and initiating the phase-sweeping operation.

Example 32: The method as recited in example 31, further comprising: receiving, from the base station, a phase-sweeping pattern; and initiating the phase-sweeping operation using the phase-sweeping pattern.

Example 33: A base station apparatus comprising: at least one wireless transceiver; a processor; and computer-readable storage media comprising instructions, responsive to execution by the processor, for directing the base station apparatus to perform any one of the methods recited in examples 1 to 21 using the at least one wireless transceiver.

Example 34: An adaptive phase-changing device, APD, comprising: a reconfigurable intelligent surface, RIS; at least one wireless transceiver; a processor; and computer-readable storage media comprising instructions, responsive to execution by the processor, for directing the APD to perform any one of the methods recited in examples 22 to 32.

Example 35: A computer-readable storage media comprising instructions that, responsive to execution by a processor, cause a method as recited in any one of examples 1 to 32 to be performed.

The invention claimed is:

1. A method performed by a base station for configuring an adaptive phase-changing device (APD) the method comprising:
receiving from a user equipment (UE) at least one link quality parameter that is indicative of a channel impairment;
identifying, using the at least one link quality parameter, a surface configuration for a reconfigurable intelligent surface (RIS) of the APD that mitigates the channel impairment by transforming characteristics of a wireless signal propagated between the base station and the UE;

determining, using the at least one link quality parameter, a position configuration for the APD to mitigate the channel impairment by changing a position of the APD;

transmitting, to the APD using an adaptive phase-changing device control channel, APD-control-channel, a first indication that indicates the identified surface configuration;

transmitting a second indication that indicates the determined position configuration to the APD; and communicating with the UE using the APD by:
  transmitting, a downlink wireless signal for the UE towards the RIS of the APD; or
  receiving an uplink wireless signal from the UE, the uplink wireless signal being transformed by the RIS of the APD.

2. The method as recited in claim 1, wherein determining the position configuration for the APD further comprises at least one of:
  determining one or more of: a first rotation around a first axis that defines a spatial region; a second rotation around a second axis that defines the spatial region; a third rotation around a third axis that defines the spatial region; a linear adjustment along at least one of the first axis, second axis; or third axis, or a velocity of the first rotation, the second rotation, the third rotation, or the linear adjustment; or
  initiating a phase sweeping operation at the APD, receiving one or more link quality parameters from the UE that measure a performance of the phase sweeping operation at the APD, and selecting the position configuration using the one or more link quality parameters that measure the performance of the phase sweeping operation.

3. The method as recited in claim 1, wherein determining the position configuration further comprises:
  inputting the at least one link quality parameter to a machine-learning algorithm; and
  obtaining the position configuration from the machine-learning algorithm.

4. The method as recited in claim 1, further comprising:
  identifying at least an estimated UE-location or an estimated UE-velocity; and
  selecting the APD based on the estimated UE-location or the estimated UE-velocity.

5. The method as recited in claim 1, wherein communicating with the UE further comprises:
  communicating with the UE in a first operating frequency band, and
  wherein transmitting the first indication comprises:
  communicating with the APD using an APD-control-channel in a second operating frequency band that is different from the first operating frequency band.

6. The method as recited in claim 5, wherein communicating with the APD using an APD-control-channel comprises at least one of:
  communicating with the APD using an adaptive phase-changing device fast-control channel, APD fast-control-channel; or
  communicating with the APD using an adaptive phase-changing device slow-control channel, APD slow-control-channel.

7. The method as recited in claim 1, wherein identifying the surface configuration and transmitting the first indication of the surface configuration further comprise:
  identifying a phase vector from a surface-configuration codebook based on the at least one link quality parameter and transmitting, to the APD, a codebook index that maps to the phase vector; or
  determining a beam configuration for transforming the wireless signal and transmitting, to the APD, a beam-codebook index that maps to an entry in a beam-codebook corresponding to the beam configuration.

8. The method as recited in claim 1, further comprising:
  determining timing information that includes a start time to apply the surface configuration; and
  transmitting a fourth indication of the timing information to the APD.

9. The method as recited in claim 1, wherein the first indication is transmitted to the APD using a fast APD-control-channel, and/or
  the second indication is transmitted to the APD using a slow APD-control channel, and/or
  the first indication causes a change of the at least one link quality parameter faster than the second indication.

10. A method performed by an adaptive phase-changing device (APD) for configuring a Reconfigurable Intelligent Surface (RIS) and position of the APD, the method comprising:
  receiving, from a base station and over an APD-control-channel, a first indication of a surface configuration for the RIS, the receiving the first indication including receiving an index to a surface-configuration codebook;
  retrieving the surface configuration from the surface-configuration codebook using the index;
  modifying the RIS using the surface configuration communicated by the first indication;
  receiving, from the base station and over the APD-control-channel, a second indication of a position configuration; and
  modifying the position of the APD based on the second indication.

11. The method as recited in claim 10, wherein the receiving the first indication of the surface configuration further comprises:
  receiving timing information, and
  wherein modifying the RIS further comprises:
  modifying the RIS based on the timing information.

12. The method as recited in claim 11, wherein modifying the RIS further comprises:
  modifying the RIS based on at least one of:
    a start time included in the timing information that indicates when to begin applying the surface configuration to the APD; or
    a stop time included in the timing information that indicates when to stop applying the surface configuration to the APD.

13. The method as recited in claim 10, further comprising:
  receiving, from the base station, a command to initiate a phase sweeping operation; and
  initiating the phase sweeping operation.

14. The method as recited in claim 10, wherein receiving the second indication of the position configuration indicates one or more of:
  a first rotation around a first axis that defines a spatial region;
  a second rotation around a second axis that defines the spatial region;
  a third rotation around a third axis that defines the spatial region;
  a linear adjustment along at least one of the first axis, second axis, or third axis; or a velocity of the first rotation, the second rotation, the third rotation, or the linear adjustment.

15. The method as recited in claim 10, wherein the receiving the first indication comprises:
receiving the first indication using an adaptive phase-changing device fast-control channel, APD fast-control-channel; or
receiving the first indication using an adaptive phase-changing device slow-control channel, APD slow-control-channel; and
wherein the receiving the second indication comprises:
receiving the second indication using the APD fast-control-channel; or
receiving the second indication using the APD slow-control-channel.

16. A base station apparatus comprising:
at least one wireless transceiver;
a processor; and
computer-readable storage media comprising instructions, responsive to execution by the processor, for directing the base station apparatus to:
receive from a user equipment (UE) at least one link quality parameter that is indicative of a channel impairment;
identify, using the at least one link quality parameter, a surface configuration for a reconfigurable intelligent surface (RIS) of an adaptive phase-changing device (APD) that mitigates the channel impairment by transforming characteristics of a wireless signal propagated between the base station and the UE;
determine, using the at least one link quality parameter, a position configuration for the APD to mitigate the channel impairment by changing a position of the APD;
transmit, to the APD using an adaptive phase-changing device control channel, APD-control-channel, a first indication that indicates the identified surface configuration;
transmit a second indication that indicates the determined position configuration to the APD; and
communicate with the UE using the APD by:
transmitting, a downlink wireless signal for the UE towards the RIS of the APD; or
receiving an uplink wireless signal from the UE, the uplink wireless signal being transformed by the RIS of the APD.

17. The base station apparatus of claim 16, wherein the instructions for the determination of the position configuration for the APD are executable to further configure the base station apparatus to:
determine one or more of: a first rotation around a first axis that defines a spatial region; a second rotation around a second axis that defines the spatial region; a third rotation around a third axis that defines the spatial region; a linear adjustment along at least one of the first axis, second axis; or third axis, or a velocity of the first rotation, the second rotation, the third rotation, or the linear adjustment; or
initiate a phase sweeping operation at the APD, receiving one or more link quality parameters from the UE that measure a performance of the phase sweeping operation at the APD, and selecting the position configuration using the one or more link quality parameters that measure the performance of the phase sweeping operation.

18. The base station apparatus of claim 16, wherein the instructions for the determination of the position configuration are executable to further configure the base station apparatus to:
input the at least one link quality parameter to a machine-learning algorithm; and
obtain the position configuration from the machine-learning algorithm.

19. An adaptive phase-changing device (APD) comprising:
a reconfigurable intelligent surface (RIS);
at least one wireless transceiver;
a processor; and
computer-readable storage media comprising instructions, responsive to execution by the processor, for directing the APD to:
receive, from a base station and over an APD-control-channel, a first indication of a surface configuration for the RIS, the reception of the first indication including receiving an index to a surface-configuration codebook;
retrieve the surface configuration from the surface-configuration codebook using the index;
modify the RIS using the surface configuration communicated by the first indication;
receive, from the base station and over the APD-control-channel, a second indication of a position configuration; and
modify the position of the APD based on the second indication.

20. The adaptive phase-changing device of claim 19, wherein the reception of the first indication of the surface configuration further directs the APD to:
receive timing information, and
wherein the modification of the RIS further configures the APD to:
modify the RIS based on the timing information.

* * * * *